US007344235B2

(12) United States Patent
Soga et al.

(10) Patent No.: US 7,344,235 B2
(45) Date of Patent: Mar. 18, 2008

(54) INK COMPOSITION FOR INK JET RECORDING, INK CARTRIDGE, NOZZLE PLATE FOR INK JET RECORDING, INK JET HEAD, AND RECORDING APPARATUS

(75) Inventors: Mamoru Soga, Osaka (JP); Hidekazu Arase, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/341,004

(22) Filed: Jan. 13, 2003

(65) Prior Publication Data

US 2003/0206214 A1 Nov. 6, 2003

(30) Foreign Application Priority Data

Jan. 15, 2002 (JP) ............................ 2002-005568

(51) Int. Cl.
*C08J 3/00* (2006.01)
*C08K 5/24* (2006.01)
*C08L 83/00* (2006.01)
*B41J 29/38* (2006.01)
*G01D 11/00* (2006.01)

(52) U.S. Cl. .................. 347/100; 106/31.27; 106/31.6; 347/5; 347/6; 347/9; 347/14; 347/20; 347/23; 347/29; 347/45; 347/47; 347/95; 347/96; 523/160; 523/161; 523/588; 524/263; 524/265; 524/588; 528/38; 528/42

(58) Field of Classification Search ................ 523/160, 523/161; 106/31.27, 31.6; 524/263, 265, 524/588; 528/38, 42; 347/5, 6, 9, 14, 20, 347/23, 29, 47, 100, 45, 95, 96
See application file for complete search history.

(56) References Cited

U.S. PATENT DOCUMENTS 4,368,476 A * 1/1983 Uehara et al. ................ 347/45
5,883,185 A * 3/1999 Matsumura et al. ........ 524/838
6,264,730 B1 7/2001 Matsumura et al.
6,419,732 B1 * 7/2002 Matsumura et al. ..... 106/31.75
6,582,620 B2 * 6/2003 Miyadai et al. ............ 252/8.62
6,585,362 B2 * 7/2003 Blease et al. ................. 347/92
6,630,205 B2 * 10/2003 Brueck et al. .............. 427/387
2004/0050293 A1 * 3/2004 Arase et al. ............. 106/31.27

FOREIGN PATENT DOCUMENTS

EP 738771 A1 * 10/1996
JP 55158980 A * 12/1980
JP 06-008448 A 1/1994
JP 06210857 A * 8/1994
JP 09-164689 A 6/1997
JP 10-212439 A 8/1998
JP 11-293167 A 10/1999
JP 11-315231 A 11/1999
JP 2000-178494 A 6/2000
JP 2000-280481 A 10/2000
JP 2001-063043 A 3/2001

OTHER PUBLICATIONS

Machine Translation of JP 06-210857 (1994).*

* cited by examiner

*Primary Examiner*—Patrick Niland
(74) *Attorney, Agent, or Firm*—Harness, Dickey & Pierce, P.L.C.

(57) ABSTRACT

An ink composition is produced using a water-soluble substance that undergoes condensation polymerization in the absence of water (e.g., a hydrolyzable silane compound), which includes fluoroalkyl groups. Alternatively, a water-repellent film of a nozzle plate is subjected to a surface treatment with a trialkyl silane compound.

6 Claims, 5 Drawing Sheets

INK COMPOSITION FOR INK JET RECORDING, INK CARTRIDGE, NOZZLE PLATE FOR INK JET RECORDING, INK JET HEAD, AND RECORDING APPARATUS

BACKGROUND OF THE INVENTION

1. Field of the Invention

The present invention relates to an ink composition, an ink cartridge, a nozzle plate, an ink jet head, and a recording apparatus, which are suitable for ink jet recording.

2. Description of the Background Art

Ink containing a colorant (a dye or a pigment), a humectant and water is well known in the art as ink for use in ink jet recording. However, an image that is formed on a recording medium such as recording paper by using ink containing a colorant has poor water-resistivity, i.e., when the image is wet with water, the colorant bleeds into the water. The water-resistivity will be very poor when the image is recorded on plain paper (a type of paper that is widely available on the market for with electrophotographic copiers, among others, but is not intended to have optimal structure, composition, properties, etc., for ink jet recording).

In view of this, it has been proposed in the art to improve the water-resistivity of an image on a recording medium by using ink containing a hydrolyzable silane compound (an organic silicon compound) (see, for example, Japanese Laid-Open Patent Publication Nos. 10-212439, 11-293167, 11-315231 and 2000-178494). With such ink, when the water (solvent) of an ink droplet attached to the recording medium evaporates or permeates into the recording medium, the silane compound remaining on the recording medium undergoes condensation polymerization, and the condensation-polymerized silane compound encloses the colorant. Therefore, even if the image on the recording medium is wet with water, the colorant does not bleed into the water. Thus, the water-resistivity of the image is improved.

An ink jet type recording apparatus includes a nozzle plate with nozzles formed therein, and ink is discharged through the nozzles and lands on the recording medium. If the nozzle plate is not sufficiently water-repellent around the nozzles, some ink is likely to be deposited on the nozzle plate around a nozzle. Then, the ink deposit deflects the discharge direction of the next ink droplet to be discharged, thereby lowering the image quality.

It is known in the art to form a water-repellent film on the ink exit side of a nozzle plate. For example, Japanese Laid-Open Patent Publication No. 6-8448 describes forming a polymerized fluoro-compound film on the surface of a nozzle plate. Moreover, for example, Japanese Laid-Open Patent Publication No. 9-164689 describes coating the surface of a nozzle plate with an electroless nickel plating film in which polytetrafluoroethylene fine grains are dispersed. Furthermore, Japanese Laid-Open Patent Publication No. 2000-280481 describes forming, on the surface of a nozzle plate, a sol-gel film containing a fluoroalkyl silane. In addition, Japanese Laid-Open Patent Publication No. 2001-63043 describes forming, on the surface of a nozzle plate, a water-repellent film by a high-frequency plasma CVD (chemical vapor deposition) method using an organic silicon compound as a material.

If a water-repellent film as described in these publications is formed on the surface of a nozzle plate 9, sufficient water repellency is obtained to prevent ink from being deposited on the nozzle plate 9, in a case where normal ink, i.e., ink that does not contain a hydrolyzable silane compound, is used.

However, as illustrated in FIG. 7, active hydrogen, such as a hydroxyl group, a carboxyl group or a silanol group, is present on the surface of the nozzle plate 9 (the surface of a water-repellent film 9*a*). Therefore, when ink that contains a hydrolyzable silane compound and has improved water-resistivity is used, the active hydrogen present on the surface of the nozzle plate 9 and the silane compound contained in the ink react with each other so that the silane compound (ink) is deposited on the surface of the nozzle plate 9. The silane compound contains an amino group for interaction with the colorant. Therefore, when the silane compound is deposited on the surface of the nozzle plate 9, the surface of the nozzle plate 9 is turned hydrophilic by the amino group. Then, the ink deposit on the nozzle plate 9 deflects the discharge direction of the next ink droplet to be discharged through a nozzle, thereby causing a shift in the ink landing position. Moreover, once some ink is deposited on the nozzle plate 9, the surface of the nozzle plate 9 is turned hydrophilic, thereby attracting more ink to be deposited thereon. As the amount of the ink deposit on the nozzle plate 9 increases, a nozzle 14 may possibly be clogged, thereby preventing subsequent ink droplets from being discharged from the nozzle 14.

A normal recording apparatus periodically performs a cleaning operation of wiping the ink deposit off the surface of the nozzle plate with a rubber-made blade, or the like. However, when ink containing a hydrolyzable silane compound is deposited on the nozzle plate, such a cleaning operation promotes the reaction between the active hydrogen on the surface of the nozzle plate and the silane compound. Therefore, the ink deposit cannot be wiped off the nozzle plate. Thus, when ink containing a hydrolyzable silane compound is used, the shift in the ink landing position and the nozzle clogging cannot be prevented by cleaning the nozzle plate.

SUMMARY OF THE INVENTION

The present invention has been made in view of the above, and has an object to prevent a shift in the ink landing position and nozzle clogging due to ink being deposited on a nozzle plate in which nozzles are formed, where an image is formed by discharging, through the nozzles, an ink composition containing a water-soluble substance that undergoes condensation polymerization in the absence of water, such as a hydrolyzable silane compound, so as to improve the image quality.

A first aspect of the present invention is directed to a composition of ink, with which it is possible to prevent a shift in the ink landing position even when some of the ink is deposited on a nozzle plate.

Specifically, an ink composition for ink jet recording of the present invention is a water-resistive ink including a colorant, a humectant, water, and a water-soluble substance that undergoes condensation polymerization in the absence of the water. In the ink composition for ink jet recording, the water-soluble substance includes a fluoroalkyl group.

The water-soluble substance may be a hydrolyzable silane compound. While it is also effective in terms of the water-resistivity to use a water-soluble polymer, such as a titanium coupling agent or a gelatin, in an ink composition, it is preferred to use a hydrolyzable silane in view of the stability in an ink composition.

As described above, with an ink composition that includes a water-soluble substance that undergoes condensation polymerization in the absence of water (e.g., a hydrolyzable silane compound), as the water therein evaporates, the active hydrogen present on the surface of the nozzle plate reacts with the silane compound in the ink composition, whereby the ink is deposited on the surface of the nozzle plate having the water-repellent film formed thereon. Then, the surface of the nozzle plate is turned hydrophilic by the amino alkyl group in the water-soluble substance.

However, with the ink composition of the present invention as described above, even if the ink is deposited on the surface of the nozzle plate, the water repellency of the surface of the nozzle plate does not deteriorate because of the fluoroalkyl group introduced into the water-soluble substance. Moreover, the fluoroalkyl group even gives water repellency to the surface of the nozzle plate.

Thus, even if ink is deposited on the surface of the nozzle plate, the nozzle plate is not turned hydrophilic, whereby the discharge direction of the next ink droplet is prevented from being deflected by the ink deposit on the surface of the nozzle plate. As a result, the straightness of the ink droplet traveling path is improved. Moreover, once some ink is deposited on the surface of the nozzle plate, the surface of the nozzle plate is water-repellent due to the presence of the ink deposit, whereby subsequent ink droplets will not be deposited on the surface of the nozzle plate. Therefore, the amount of the ink deposit on the nozzle plate will not increase. As a result, the nozzles are prevented from being clogged, whereby it is possible to stably discharge the ink therethrough. Thus, it is possible to improve the image recording quality.

Preferably, the ink composition for ink jet recording further includes a penetrant.

In this way, the ink solvent including the humectant, the penetrant and water quickly permeates into a recording medium (e.g., paper) after ink is deposited on the recording medium. Thus, condensation polymerization of the water-soluble substance takes place quickly, whereby the colorant (a dye or a pigment) is enclosed reliably. As a result, the water-resistivity of the image is further improved.

In a case where the water-soluble substance includes a fluoroalkyl group and an amino alkyl group, the chain length of the fluoroalkyl group is preferably equal to or greater than that of the amino alkyl group.

In this way, when ink is deposited on the nozzle plate surface, the fluoroalkyl group, which is hydrophobic, is more prominent on the surface of the nozzle plate than the amino group, which is hydrophilic. As a result, it is possible to more reliably ensure the water repellency of the surface of the nozzle plate.

Preferably, the amount of the fluoroalkyl group is 0.1 to 1 times that of the amino alkyl group. In other words, it is preferred that when the ink is deposited on the nozzle plate surface, about 10% to 50% of the surface area of the nozzle plate is covered by the fluoroalkyl group.

The water-soluble substance encloses the colorant when it undergoes condensation polymerization due to the interaction between the amino group and the colorant. Therefore, the amino group is relevant to the water-resistivity of the ink. On the other hand, the fluoroalkyl group has a weak interaction with the colorant, and is not relevant to the water-resistivity of the ink. Therefore, if an excessive amount of the fluoroalkyl group is used, the enclosure of the colorant by the water-soluble substance may be hindered, thereby deteriorating the water-resistivity of the ink. Thus, the amount of the fluoroalkyl group is preferably less than or equal to that of the amino alkyl group. On the other hand, sufficient water repellency is given to the surface of the nozzle plate when the amount of the fluoroalkyl group is 1/10 of that of the amino alkyl group, i.e., when the surface area coverage by the fluoroalkyl group is about 10%. Therefore, it is preferred that the amount of the fluoroalkyl group is equal to or greater than 0.1 times that of the amino alkyl group.

An ink cartridge of the present invention includes an ink composition for ink jet recording, the ink composition including a colorant, a humectant, water, and a water-soluble substance that undergoes condensation polymerization in the absence of the water. The water-soluble substance includes a fluoroalkyl group.

A recording apparatus of the present invention includes an ink composition for ink jet recording for performing a recording operation by discharging the ink composition onto a recording medium, the ink composition including a colorant, a humectant, water, and a water-soluble substance that undergoes condensation polymerization in the absence of the water. The water-soluble substance includes a fluoroalkyl group.

A second aspect of the present invention is directed to a surface treatment to be performed on a nozzle plate, with which an ink composition for ink jet recording including a water-soluble substance that undergoes condensation polymerization in the absence of water is prevented from being deposited on the surface of the nozzle plate.

Specifically, a nozzle plate for ink jet recording of the present invention is a nozzle plate in which nozzles are formed for discharging an ink composition for ink jet recording through the nozzles, the ink composition including a colorant, a humectant, water, and a water-soluble substance that undergoes condensation polymerization in the absence of water.

In the nozzle plate for ink jet recording, a water-repellent film is formed on an ink exit side of the nozzle plate, and the water-repellent film is subjected to a surface treatment with a trialkyl silane compound. The water-soluble substance may be a hydrolyzable silane compound.

In this way, the trialkyl silane compound reacts with the active hydrogen present on the surface of the nozzle plate having the water-repellent film formed thereon, thereby eliminating the active hydrogen from the nozzle plate surface. Therefore, even if ink containing a water-soluble substance that undergoes condensation polymerization in the absence of water is discharged through the nozzles formed in the nozzle plate, the ink will not be deposited on the surface of the nozzle plate because the active hydrogen is absent on the surface of the nozzle plate. Thus, the ink discharge direction is prevented from being deflected, and the straightness of the ink droplet traveling path is improved. Moreover, clogging of the nozzles is also prevented, whereby it is possible to stably discharge the ink therethrough. As a result, it is possible to improve the image recording quality.

The trialkyl silane compound may be a trialkyl chlorosilane. Alternatively, the trialkyl silane compound may be a trialkyl alkoxysilane.

A trialkyl chlorosilane is more reactive with active hydrogen than a trialkyl alkoxysilane. Therefore, it is preferred that the water-repellent film of the nozzle plate is subjected to a surface treatment with a trialkyl chlorosilane, whereby the active hydrogen can be eliminated from the water-repellent film more reliably.

Moreover, the trialkyl silane compound may be a trialkyl chlorosilane in which one, some or all of alkyl groups are substituted with fluoroalkyl groups.

Furthermore, the trialkyl silane compound may be trialkyl alkoxysilane in which one, some or all of alkyl groups are substituted with fluoroalkyl groups.

When the water-repellent film of the nozzle plate is subjected to a surface treatment with a trialkyl chlorosilane or a trialkyl alkoxysilane, the deposition of ink on the surface of the nozzle plate is depressed because the alkyl group in the trialkyl chlorosilane or the trialkyl alkoxysilane is hydrophobic. On the other hand, when one, some or all of the alkyl groups in the trialkyl chlorosilane or the trialkyl alkoxysilane are substituted with fluoroalkyl groups, the deposition of ink on the surface of the nozzle plate is further depressed because the fluoroalkyl group is water-repellent.

An ink jet head of the present invention includes a nozzle plate in which nozzles are formed for discharging an ink composition for ink jet recording through the nozzles, the ink composition including a colorant, a humectant, water, and a water-soluble substance that undergoes condensation polymerization in the absence of the water. A water-repellent film is formed on an ink exit side of the nozzle plate, and the water-repellent film is subjected to a surface treatment with a trialkyl silane compound.

Another recording apparatus of the present invention includes a nozzle plate in which nozzles are formed for performing a recording operation by discharging an ink composition for ink jet recording through the nozzles onto a recording medium, the ink composition including a colorant, a humectant, water, and a water-soluble substance that undergoes condensation polymerization in the absence of the water.

In the recording apparatus, a water-repellent film is formed on an ink exit side of the nozzle plate, and the water-repellent film is subjected to a surface treatment with a trialkyl silane compound.

DESCRIPTION OF THE PREFERRED EMBODIMENTS

Embodiment 1

Figure 1:
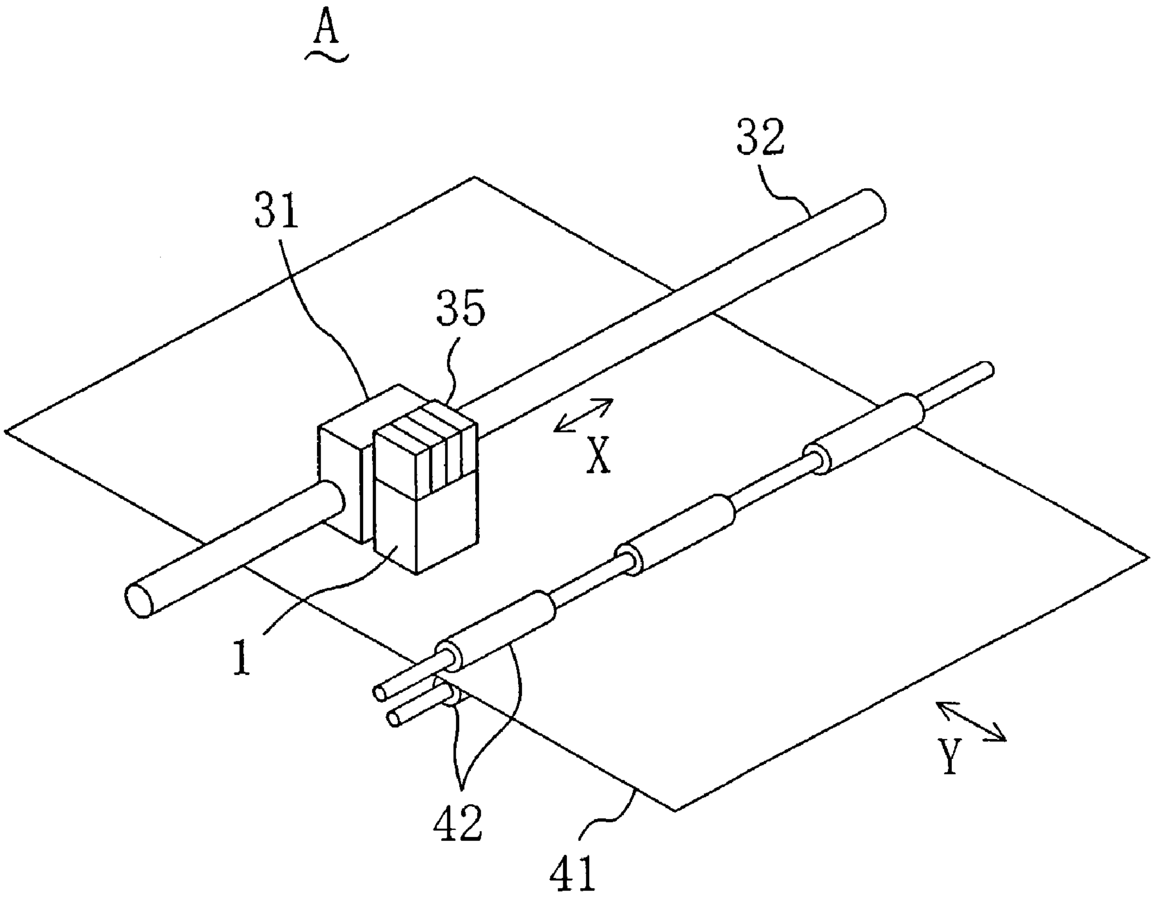
FIG. 1 is a schematic perspective view illustrating an ink jet recording apparatus that uses an ink composition for ink jet recording according to an embodiment of the present invention.

Embodiment 1 is directed to an ink composition. FIG. 1 schematically illustrates an ink jet recording apparatus A that uses an ink composition for ink jet recording according to an embodiment of the present invention. The recording apparatus A includes an ink jet head 1 for discharging ink to recording paper 41 as a recording medium. An ink cartridge 35 filled with ink is attached to the upper surface of the ink jet head 1. The ink jet head 1 is supported and fixed to a carriage 31. The carriage 31 is provided with a carriage motor (not shown). The ink jet head 1 and the carriage 31 are reciprocated by the carriage motor in the primary scanning direction (the X direction as shown in FIG. 1 and FIG. 2) while being guided by a carriage shaft 32 which extends in the primary scanning direction.

Figure 2:
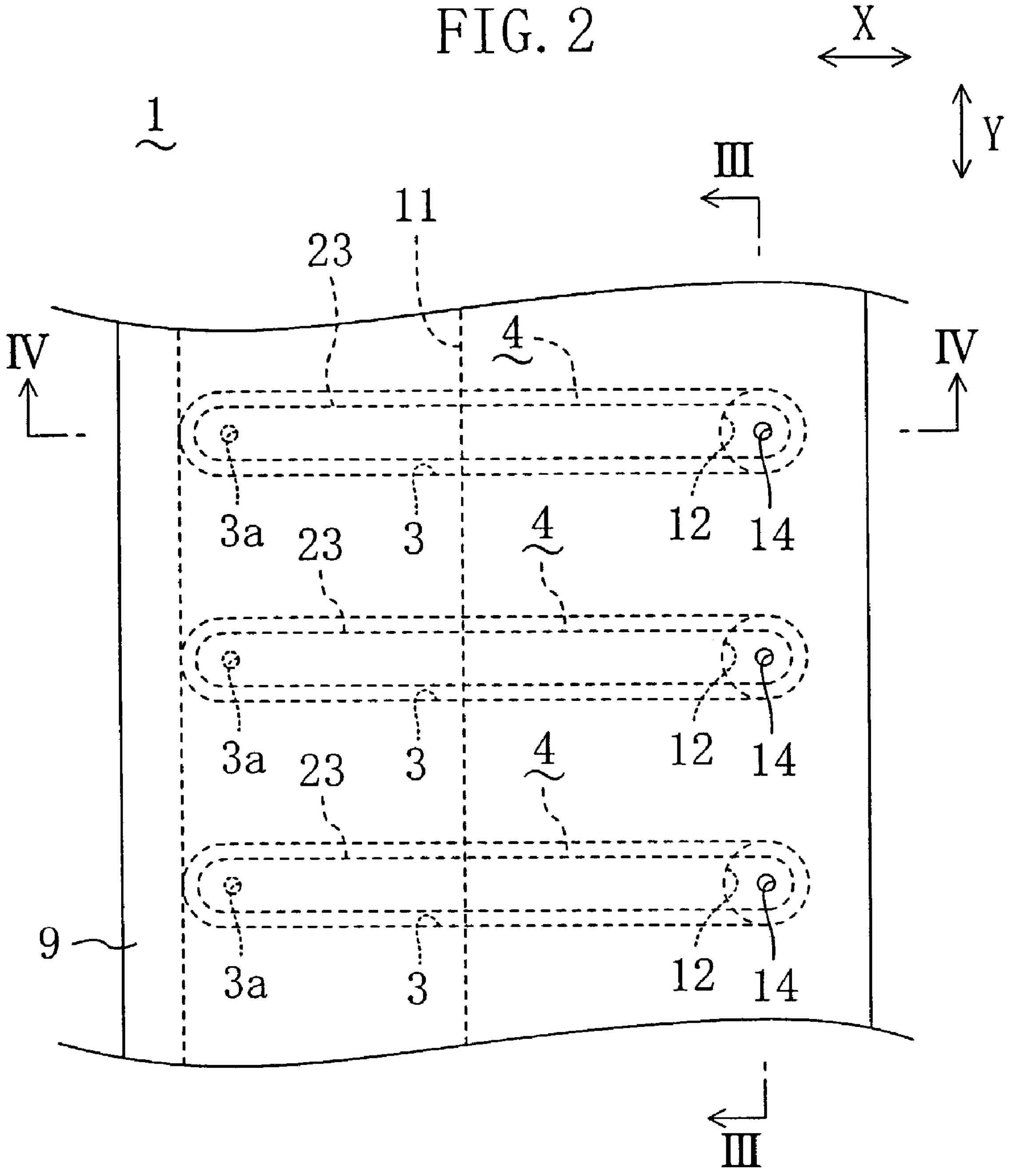
FIG. 2 is a diagram illustrating a part of the bottom surface of an ink jet head of the ink jet recording apparatus.

The recording paper 41 is sandwiched between two carrier rollers 42 which are rotated by a carrier motor (not shown), and is carried by the carrier motor and the carrier rollers 42 under the ink jet head 1 in the secondary scanning direction (the Y direction as shown in FIG. 1 and FIG. 2) which is perpendicular to the primary scanning direction.

Figure 3:
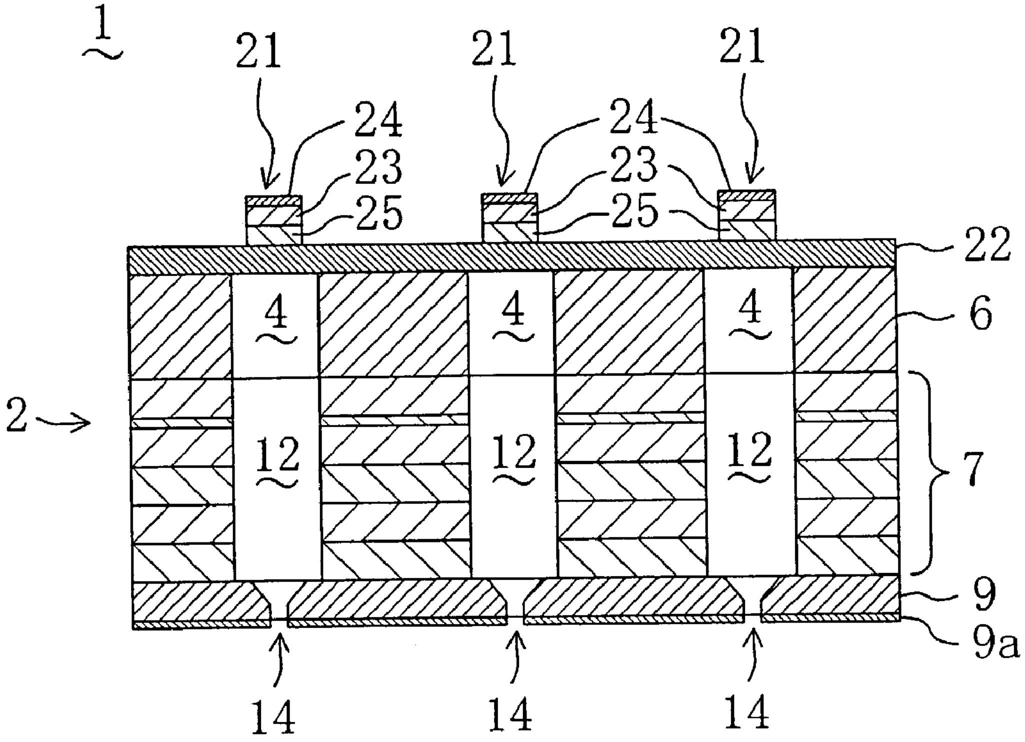
FIG. 3 is a cross-sectional view taken along line III-III of FIG. 2.
Figure 4:
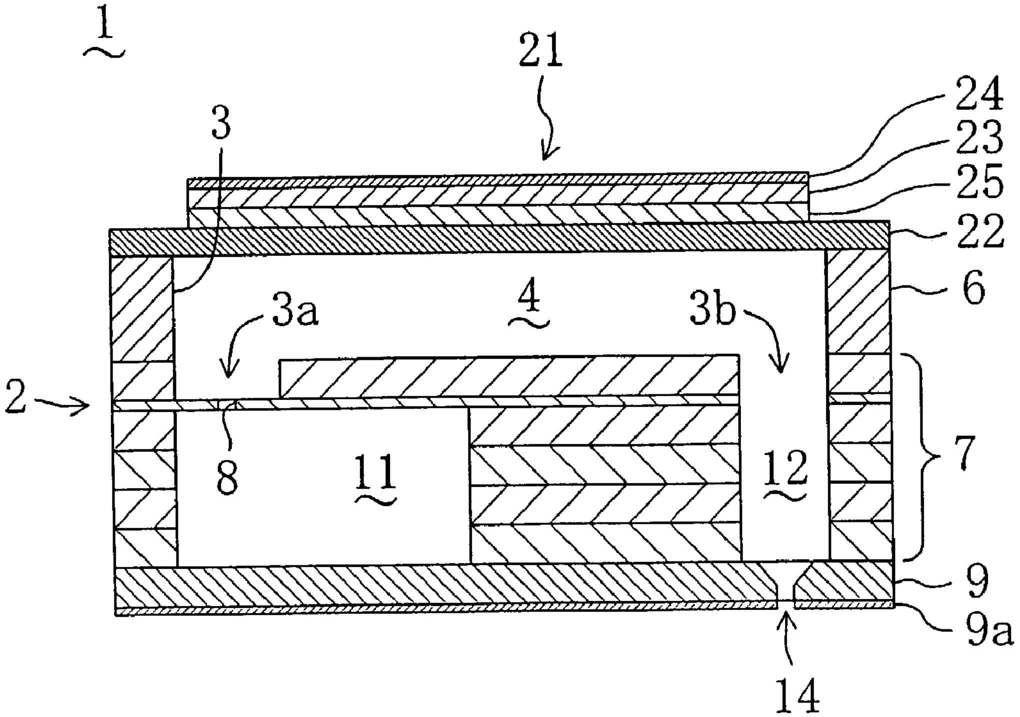
FIG. 4 is a cross-sectional view taken along line IV-IV of FIG. 2.

As illustrated in FIG. 2 to FIG. 4, the ink jet head 1 includes a head assembly 2 in which a plurality of pressure chamber depressions 3 are formed. Each pressure chamber depression 3 includes a supply port 3*a* through which ink is supplied, and a discharge port 3*b* through which ink is discharged. The depressions 3 of the head assembly 2 are opened so as to extend in the primary scanning direction on the upper surface of the head assembly 2, and are substantially equally spaced apart from one another in the secondary scanning direction. The total length of the opening of each depression 3 is set to be about 1250 μm and the width thereof is set to be about 130 μm. Note that the opposing end portions of the opening of each depression 3 are each in a generally semicircular shape.

A pressure chamber member 6 made of a photosensitive glass having a thickness of about 200 μm forms the side wall of each depression 3 of the head assembly 2. An ink channel member 7 forms the bottom wall of each depression 3. The ink channel member 7 is adhered and fixed to the lower surface of the pressure chamber member 6, and includes six thin stainless steel plates layered together. The ink channel member 7 includes therein a plurality of orifices 8 each connected to the supply port 3*a* of the depression 3, a ink supply channel 11 connected to the orifices 8 and extending in the secondary scanning direction, and a plurality of ink discharge channels 12 each connected to the discharge port 3*b*.

The orifices 8 are formed in the second one from the top of the six thin stainless steel plates of the ink channel member 7 that is thinner than the others. The diameter of each orifice 8 is set to be about 38 μm. Moreover, the ink supply channel 11 is connected to the ink cartridge 35 so that ink is supplied from the ink cartridge 35 into the ink supply channel 11.

The nozzle plate 9 made of a stainless steel is adhered and fixed to the lower surface of the ink channel member 7. In the nozzle plate 9, a plurality of nozzles 14 are formed so as to discharge ink droplets therethrough toward the recording paper 41. The lower surface of the nozzle plate 9 is covered with the water-repellent film 9*a*. The water-repellent film 9*a* may be, for example, a polymerized fluoro-compound film, an electroless nickel plating film in which polytetrafluoroethylene fine grains are dispersed, a sol-gel film containing a fluoroalkyl silane, a high-frequency plasma CVD film made from an organic silicon compound, or the like. These water-repellent films can be formed by methods known in the art.

Each nozzle 14 is connected to the ink discharge channel 12, via which it is communicated to the discharge port 3*b* of the depression 3. The nozzles 14 are arranged in a row extending in the secondary scanning direction on the lower surface of the ink jet head 1. Note that each nozzle 14 includes a tapered portion where the nozzle diameter gradually decreases toward the nozzle exit, and a straight portion connected to the tip of the tapered portion. The nozzle diameter in the straight portion is set to be about 20 μm.

A piezoelectric actuator 21 is provided over each depression 3 of the head assembly 2. The piezoelectric actuators 21 have a vibration plate 22 made of Cr. The vibration plate 22, being adhered and fixed to the upper surface of the head assembly 2, covers each depression 3 of the head assembly 2 so as to form, together with the depression 3, a pressure chamber 4. The vibration plate 22 is a single member shared by all the piezoelectric actuators 21, and functions also as a common electrode shared by all piezoelectric elements 23 to be described later.

Moreover, each piezoelectric actuator 21 includes a piezoelectric element 23 made of lead zirconium titanate (PZT), and a separate electrode 24 made of Pt for applying, together with the vibration plate 22, a voltage (driving voltage) to the piezoelectric element 23. The piezoelectric element 23 is provided on one surface (upper surface) of the vibration plate 22 that is away from the pressure chamber 4 in an area corresponding to the pressure chamber 4 (an area opposing the opening of the depression 3), via an intermediate layer 25 made of Cu therebetween. The separate electrode 24 is attached to one surface (upper surface) of the piezoelectric element 23 that is away from the vibration plate 22.

Each of the vibration plate 22, the piezoelectric elements 23, the separate electrodes 24 and the intermediate layers 25 is a thin film. The thickness of the vibration plate 22 is set to be about 6 μm, the thickness of each piezoelectric element 23 is set to be 8 μm or less (e.g., about 3 μm), the thickness of each separate electrode 24 is set to be about 0.2 μm, and the thickness of the intermediate layer 25 is set to be about 3 μm.

The piezoelectric actuator 21 applies a driving voltage to the piezoelectric element 23 via the vibration plate 22 and the separate electrode 24 so as to deform a portion of the vibration plate 22 corresponding to the pressure chamber 4 (a portion corresponding to the opening of the depression 3), thereby discharging ink from the pressure chamber 4 through the discharge port 3*b* and the nozzle 14. Specifically, when a pulse voltage is applied between the vibration plate 22 and the separate electrode 24, the piezoelectric element 23 contracts in the width direction, which is perpendicular to the thickness direction, through a piezoelectric effect at each rising edge of the pulse voltage. On the other hand, the vibration plate 22, the separate electrode 24 and the intermediate layer 25 do not contract. As a result, through a so-called "bimetal effect", a portion of the vibration plate 22 corresponding to the pressure chamber 4 bends toward the pressure chamber 4. The bending deformation increases the pressure in the pressure chamber 4, whereby ink in the pressure chamber 4 is pushed out through the nozzle 14 via the discharge port 3*b* and the ink discharge channel 12. Then, at each falling edge of the pulse voltage, the piezoelectric element 23 expands, and a portion of the vibration plate 22 corresponding to the pressure chamber 4 returns to its original shape, whereby the portion of the ink being pushed out through the nozzle 14 is torn off the remaining portion of the ink in the ink discharge channel 12, and the separated portion of the ink is discharged in the form of an ink droplet (having a volume of 3 pl, for example) toward the recording paper 41. The ink droplet is then attached to the surface of the recording paper 41 in the form of a dot. Moreover, as the vibration plate 22 returns from its bent shape to its original shape, the pressure chamber 4 is refilled with ink supplied from the ink cartridge 35 via the ink supply channel 11 and the supply port 3*a*. Note that the pulse voltage to be applied to each piezoelectric element 23 may be a push-pull type pulse voltage as described above, or may alternatively be a pull-push type pulse voltage that first falls from a first voltage to a second voltage lower than the first voltage and then rises back to the first voltage.

The driving voltage is applied to the piezoelectric element 23 at a predetermined interval (e.g., about 50 μs: a driving frequency of 20 kHz) while the ink jet head 1 and the carriage 31 are moved across the recording paper 41 in the primary scanning direction at a substantially constant velocity. Note however that the voltage is not applied when the ink jet head 1 is at a position where the recording paper 41 is not supposed to receive an ink droplet. In this way, ink droplets land at predetermined positions on the recording paper 41. After scanning one line, the recording paper 41 is carried by a predetermined amount in the secondary scanning direction by the carrier motor and the carrier rollers 42, and then ink droplets are discharged while moving the ink jet head 1 and the carriage 31 in the primary scanning direction again so as to scan the next line. By repeating such an operation, an intended image is formed on the recording paper 41.

The ink composition used with the recording apparatus A includes a colorant (a dye or a pigment), a humectant for preventing the ink from being dried while the ink is in the nozzle 14, etc., of the ink jet head 1, a penetrant for increasing the permeability of the ink (solvent) into the recording paper 41, water, and a hydrolyzable silane compound as a water-soluble substance that undergoes condensation polymerization in the absence of water.

When the water (solvent) of an ink droplet, which has been discharged from the nozzle 14 of the ink jet head 1 and has been attached to the recording paper 41, evaporates or permeates into the recording paper 41, the silane compound undergoes condensation polymerization and encloses the colorant. With the colorant being enclosed by the silane compound, even if the image on the recording paper 41 is wet with water, the colorant is prevented from bleeding into the water. Thus, the water-resistivity of the image is improved.

The silane compound is preferably a hydrolyzed product obtained by hydrolyzing an alkoxysilane containing an amino-group-containing organic group, a fluoroalkyl alkoxysilane, and an alkoxysilane containing no amino group, or an organic silicon compound obtained by hydrolyzing a hydrolyzable silane that is obtained by reacting an amino-group-containing hydrolyzable silane with an organic monoepoxy compound, a fluoroalkyl alkoxysilane, and a hydrolyzable silane containing no nitrogen atom.

Specific examples of the fluoroalkyl alkoxysilane include the following compounds (Formulae 1 to 10), for example.

Formula 1

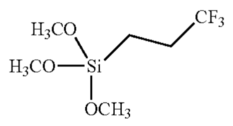

-continued

Formula 2

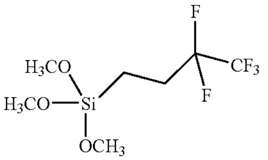

Formula 3

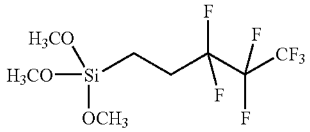

Formula 4

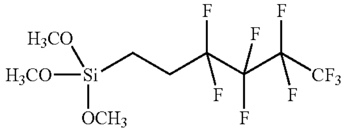

Formula 5

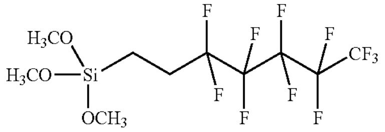

Formula 6

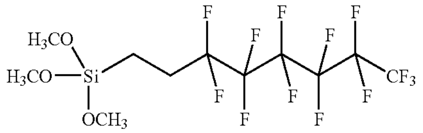

Flormula 7

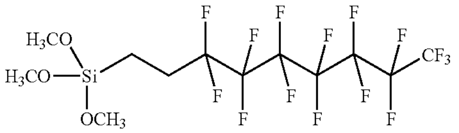

Formula 8

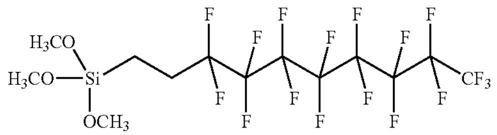

Formula 9

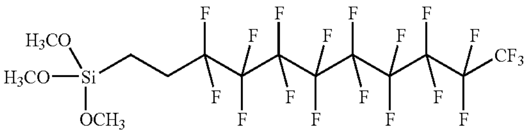

Formula 10

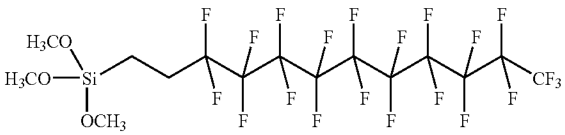

Although a dye used as the colorant may be of any type, it is preferably a water-soluble acidic dye or a direct dye.

Preferred pigments to be used as colorants are as follows. Preferred black pigments are those obtained by treating the surface of a carbon black with a diazonium salt, or those obtained by a surface treatment of a polymer through graft polymerization.

Moreover, preferred color pigments are those obtained by treating a pigment with a surface active agent such as a formalin condensation product of a naphthalenesulfonic acid salt, a ligninsulfonic acid, a dioctyl sulfosuccinate, a polyoxyethylenealkylamine or a fatty acid ester. Specifically, suitable cyan pigments include Pigment Blue 15:3, Pigment Blue 15:4, and aluminum phthalocyanine, for example. Suitable magenta pigments include Pigment Red 122, and Pigment Violet 19, for example. Furthermore, suitable yellow pigments include Pigment Yellow 74, Pigment Yellow 109, Pigment Yellow 110, and Pigment Yellow 128, for example.

The humectant is preferably a polyhydric alcohol such as glycerol, or a water-soluble nitrogen heterocyclic compound such as 2-pyrrolidone or N-methyl-2-pyrrolidone.

The penetrant is preferably a monoalkyl ether of a polyhydric alcohol such as diethylene glycol monobutyl ether. Note that while a penetrant is not essential to an ink composition, the surface tension of the ink (or the solvent therein) can be adjusted by adjusting the amount of a penetrant contained in the ink composition. With the use of a penetrant, the solvent quickly permeates into the recording paper 41 after an ink droplet is attached to the recording paper 41. As a result, after the ink droplet is attached to the recording paper 41, the condensation polymerization of the silane compound takes place quickly and sufficiently, whereby the colorant is enclosed by the silane compound quickly and reliably. Thus, in a case where a penetrant is contained in an ink composition, a high level of water-resistivity of an image is obtained even immediately after the image is formed.

Moreover, an anionic surfactant or a nonionic surfactant may be added as an adjuvant to a penetrant.

As described above, the ink composition for ink jet recording of Embodiment 1 includes a colorant, a humectant, water, and a water-soluble substance that undergoes condensation polymerization in the absence of the water (a hydrolyzable silane compound), wherein the water-soluble substance includes an amino alkyl group and a fluoroalkyl group.

Figure 5:
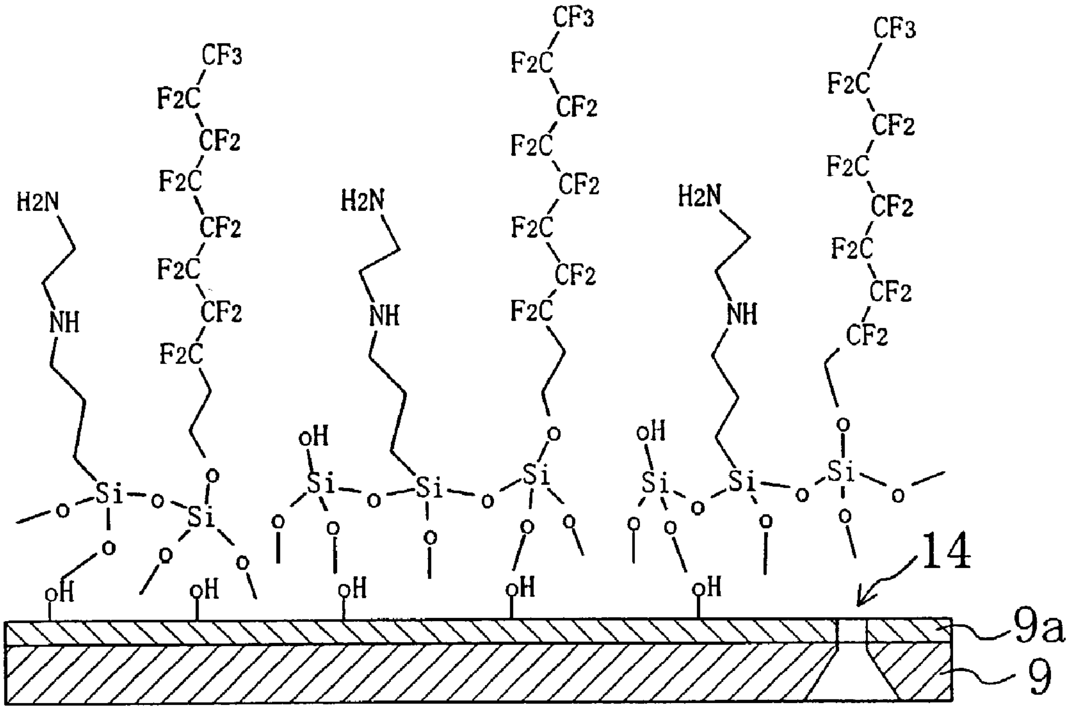
FIG. 5 is a cross-sectional view enlarged to a molecular level, illustrating a nozzle plate being used with an ink composition of Embodiment 1 of the present invention.

Due to the presence of active hydrogen on the water-repellent film 9_a_ of the nozzle plate 9, when the ink is discharged through the nozzles 14, the ink reacts with the active hydrogen on the water-repellent film 9_a_ and is deposited on the surface of the nozzle plate 9. Then, the fluoroalkyl group of the water-soluble substance is prominent on the surface of the nozzle plate 9, as illustrated in FIG. 5. In this way, water repellency can be given to the surface of the nozzle plate 9. Therefore, the discharge direction of the next ink droplet to be discharged through the nozzle 14 is prevented from being deflected by the ink deposit on the surface of the nozzle plate 9. Moreover, as the ink is deposited on the surface of the nozzle plate 9, the water repellency of the nozzle plate 9 is maintained by the ink deposit. In this way, the next ink droplet to be discharged through the nozzle 14 is not deposited on the surface of the nozzle plate 9. Thus, once some ink is deposited on the surface of the nozzle plate 9, subsequent ink droplets will not be deposited on the surface of the nozzle plate 9. Therefore, the amount of the ink deposit on the nozzle plate 9 will not increase, whereby it is possible to prevent the nozzle 14 from being clogged and thus to stably discharge the ink therethrough. As a result, it is possible to improve the image recording quality.

Particularly, when the fluoroalkyl group is more prominent on the surface of the nozzle plate 9 than the amino alkyl group, which is hydrophilic, as illustrated in FIG. 5, the water repellency can be ensured more reliably. Thus, it is preferred that the chain length of the fluoroalkyl group is equal to or greater than that of the amino alkyl group.

It is preferred that 1 to 10 parts of the fluoroalkyl group is contained in the ink composition with respect to 10 parts of the amino alkyl group. In other words, it is preferred that when the ink is deposited on the surface of the nozzle plate 9, about 10% to 50% of the surface area of the nozzle plate 9 is covered by the fluoroalkyl group. If the amount of the amino alkyl group contained in the water-soluble substance is reduced, while a large amount of the fluoroalkyl group is contained therein, the enclosure of the colorant by the water-soluble substance may be hindered. On the other hand, if the surface area coverage by the fluoroalkyl group is about 10% or more, sufficient water repellency is given to the nozzle plate 9. Therefore, the amount of the fluoroalkyl group may be 1/10 of the amount of the amino alkyl group.

Embodiment 2

While Embodiment 1 is directed to an ink composition, Embodiment 2 is directed to a surface treatment of the nozzle plate 9.

The ink jet recording apparatus A of Embodiment 2 is basically the same in structure as that of Embodiment 1. Therefore, only the difference therebetween will be described below.

In the ink jet recording apparatus A of Embodiment 2, the water-repellent film 9*a* of the nozzle plate 9 in the ink jet head 1 is different from that of Embodiment 1.

The water-repellent film 9*a* can be formed by a method known in the art, as described above. The water-repellent film 9*a* may be, for example, a polymerized fluoro compound film, an electroless nickel plating film in which polytetrafluoroethylene fine grains are dispersed, a sol-gel film containing a fluoroalkyl silane, a high-frequency plasma CVD film made from an organic silicon compound, or the like.

In Embodiment 2, the obtained water-repellent film 9*a* is subjected to a surface treatment with a trialkyl silane compound.

Specifically, the nozzle plate 9, on which the water-repellent film 9*a* has been formed, can be immersed in a trialkyl silane compound solution for a predetermined period of time, heated and dried, and then washed with water, so as to remove an excess of the trialkyl silane compound.

Figure 6:
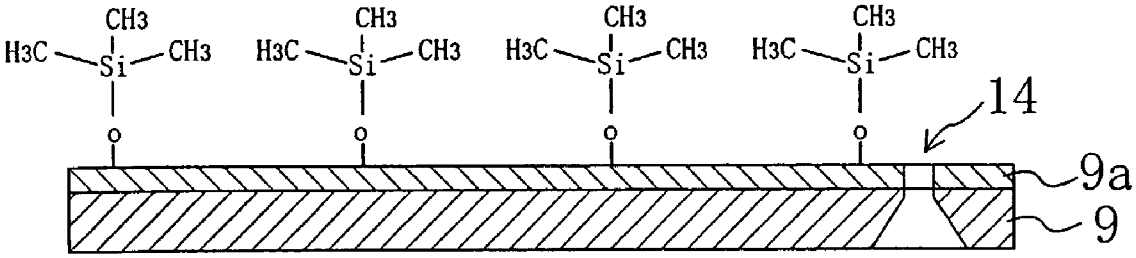
FIG. 6 is a cross-sectional view enlarged to a molecular level, illustrating a nozzle plate of Embodiment 2 of the present invention.
Figure 7:
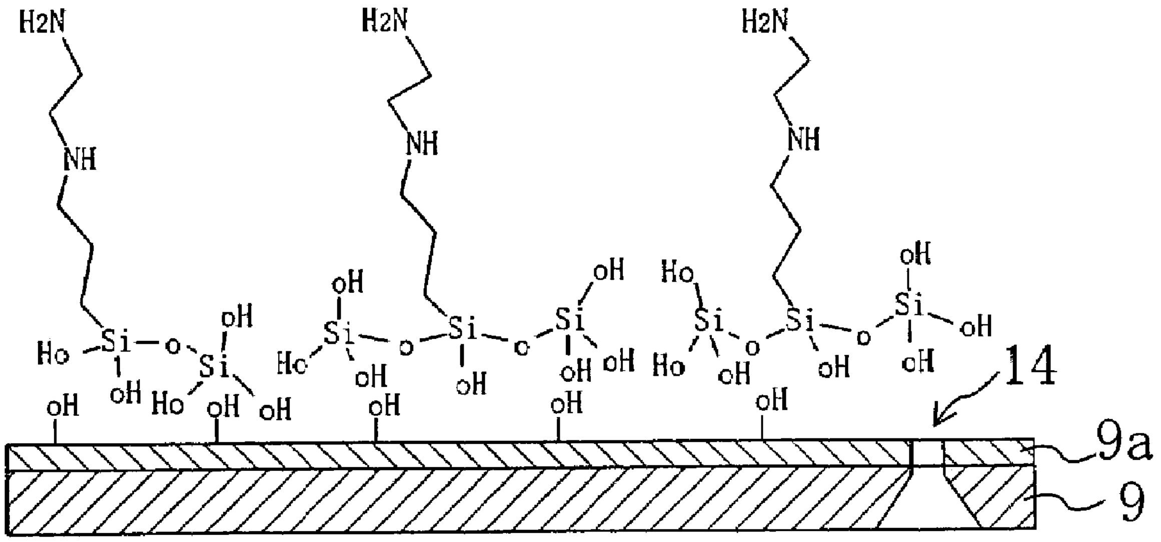
FIG. 7 PRIOR ART
FIG. 7 is a cross-sectional view enlarged to a molecular level, illustrating a nozzle plate being used with a conventional ink composition.

In this way, as illustrated in FIG. 6, a trialkyl silane compound (a trialkyl chlorosilane in the illustrated example) and the active hydrogen present on the surface of the nozzle plate 9 (water-repellent film 9*a*) are coupled together through dehydrochlorination, thereby eliminating the active hydrogen from the surface of the nozzle plate 9. As a result, even if ink containing a water-soluble substance that undergoes condensation polymerization in the absence of water (e.g., a hydrolyzable silane compound) is discharged through the nozzle 14 of the nozzle plate 9, the ink will not be deposited on the nozzle plate 9 because the active hydrogen, which would otherwise react with the silane compound in the ink, is absent on the surface of the nozzle plate 9. In this way, the ink discharge direction is prevented from being deflected, thereby improving the straightness of the ink droplet traveling path. Moreover, clogging of the nozzle 14 is also prevented, whereby it is possible to stably discharge the ink therethrough. As a result, it is possible to improve the image recording quality.

The trialkyl silane compound may be a trialkyl chlorosilane or a trialkyl alkoxysilane. While the surface treatment of the water-repellent film 9*a* may be performed with either a trialkyl chlorosilane or a trialkyl alkoxysilane, a trialkyl chlorosilane is preferred in view of the reactivity with active hydrogen.

Moreover, the trialkyl silane compound may be a trialkyl chlorosilane in which one, some or all of the alkyl groups are substituted with fluoroalkyl groups, or a trialkyl alkoxysilane in which one, some or all of the alkyl groups are substituted with fluoroalkyl groups. Since the fluoroalkyl group is water-repellent, the deposition of ink on the surface of the nozzle plate 9 is further depressed.

Specific examples of the trialkyl chlorosilane include the following compounds (Formulae 11 to 34), for example.

Formula 11

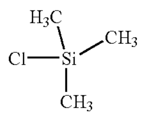

Formula 12

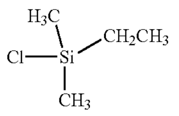

Formula 13

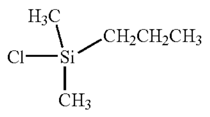

Formula 14

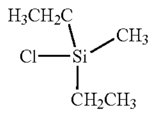

Formula 15

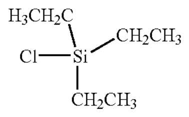

Formula 16

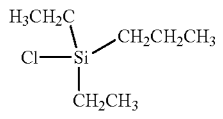

Formula 17

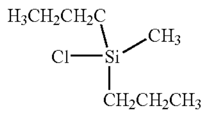

Formula 18

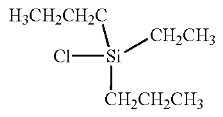

Formula 19

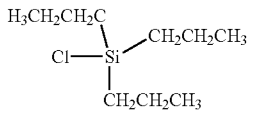

Formula 20

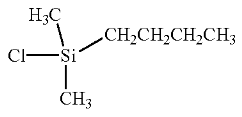

-continued

Formula 21

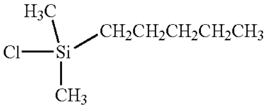

Formula 22

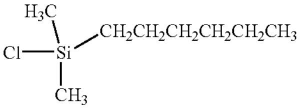

Formula 23

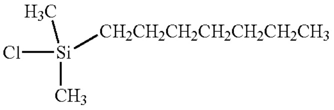

Formula 24

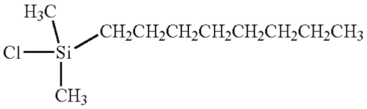

Formula 25

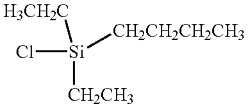

Formula 26

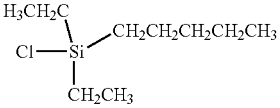

Formula 27

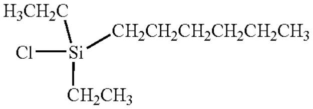

Formula 28

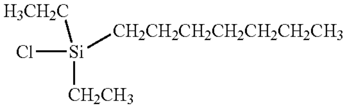

Formula 29

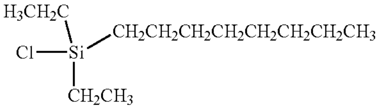

Formula 30

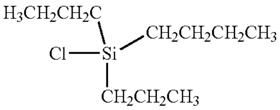

Formula 31

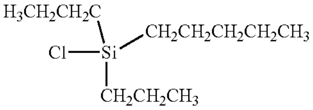

Formula 32

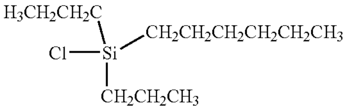

Formula 33

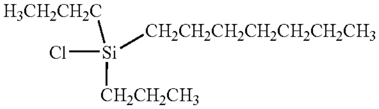

-continued

Formula 34

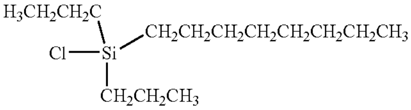

Specific examples of the trialkyl chlorosilane in which one, some or all of the alkyl groups are substituted with fluoroalkyl groups include the following compounds (Formulae 35 to 64), for example.

Formula 35

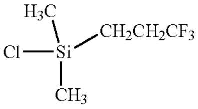

Formula 36

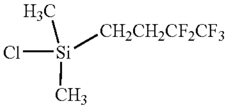

Formula 37

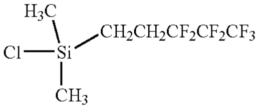

Formula 38

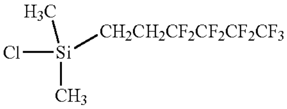

Formula 39

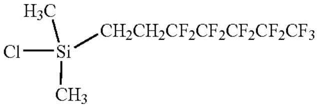

Formula 40

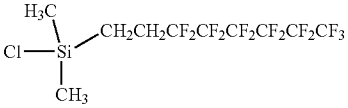

Formula 41

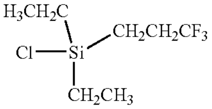

Formula 42

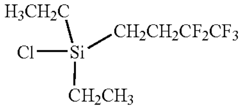

Formula 43

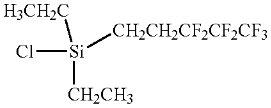

Formula 44

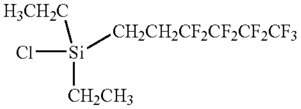

-continued
Formula 45
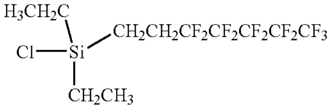
Formula 46
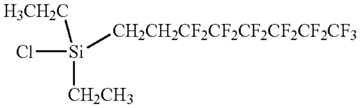
Formula 47
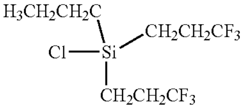
Formula 48
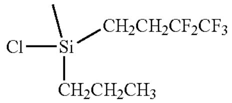
Formula 49
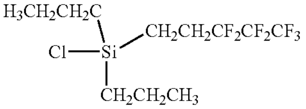
Formula 50
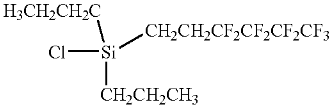
Formula 51
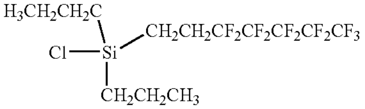
Formula 52
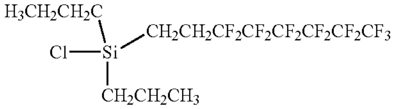
Formula 53
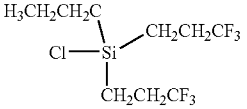
Formula 54
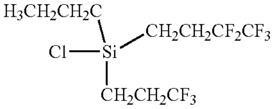
Formula 55
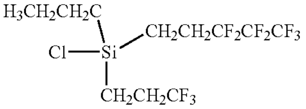
Formula 56
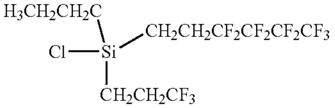
Formula 57
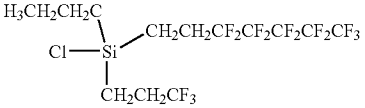
-continued
Formula 58
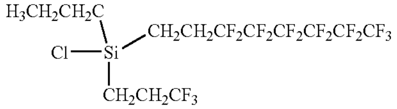
Formula 59
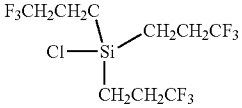
Formula 60
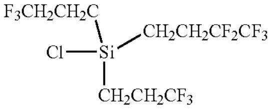
Formula 61
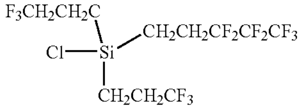
Formual 62
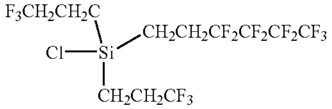
Formula 63
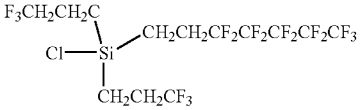
Formula 64
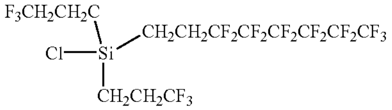
Specific examples of the trialkyl alkoxysilane include the following compounds (Formulae 65 to 96), for example.
Formula 65
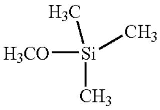
Formula 66
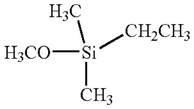
Formula 67
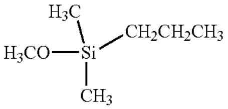
Formula 68
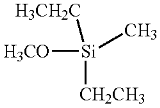
Formula 69
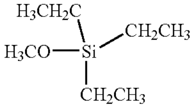

-continued
Formula 70
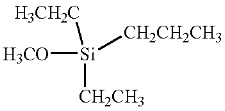
Formula 71
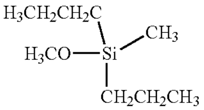
Formula 72
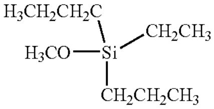
Formula 73
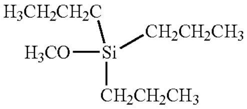
Formula 74
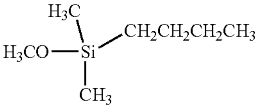
Formula 75
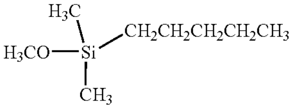
Formula 76
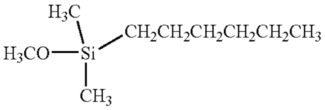
Formula 77
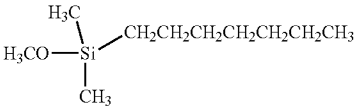
Formula 78
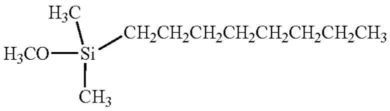
Formula 79
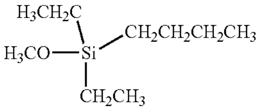
Formula 80
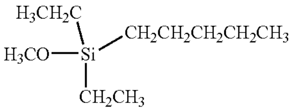
Formula 81
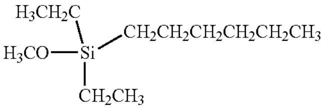
Formula 82
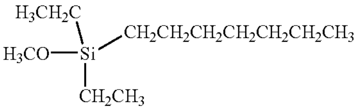
-continued
Formula 83
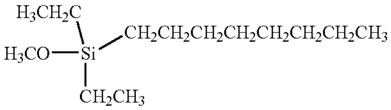
Formula 84
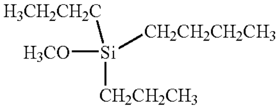
Formula 85
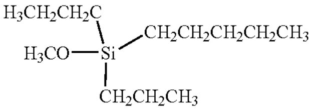
Formula 86
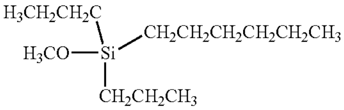
Formula 87
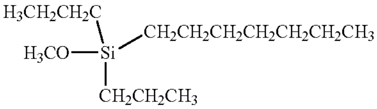
Formula 88
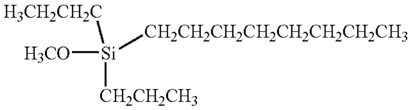
Formula 89
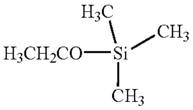
Formula 90
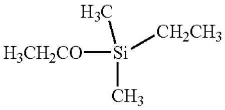
Formula 91
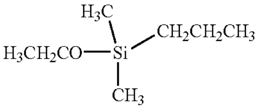
Formula 92
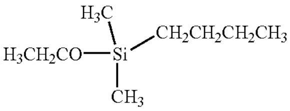
Formula 93
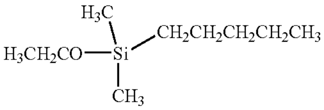
Formula 94
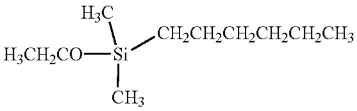
Formula 95
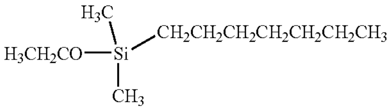

-continued

Formula 96

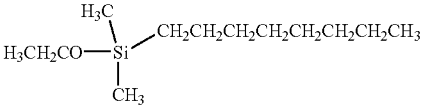

Specific examples of the trialkyl alkoxysilane in which one, some or all of the alkyl groups are substituted with fluoroalkyl groups include the following compounds Formulae 97 to 132), for example.

Formula 97

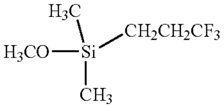

Formula 98

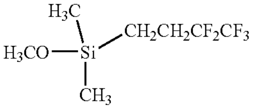

Formula 99

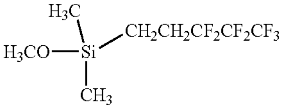

Formula 100

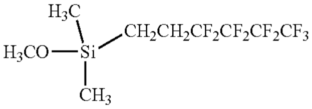

Formula 101

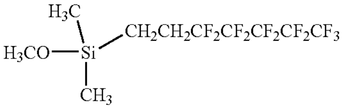

Formula 102

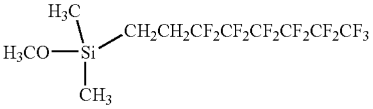

Formula 103

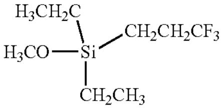

Formula 104

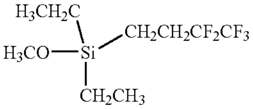

Formula 105

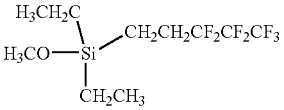

Formula 106

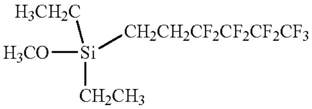

-continued

Formula 107

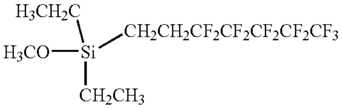

Formula 108

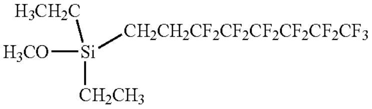

Formula 109

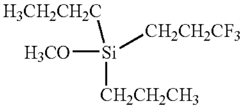

Formula 110

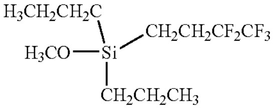

Formula 111

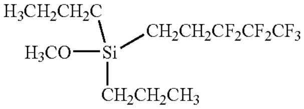

Formula 112

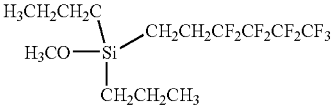

Formula 113

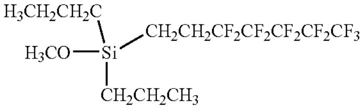

Formula 114

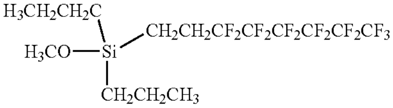

Formula 115

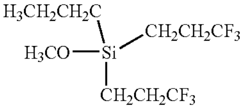

Formula 116

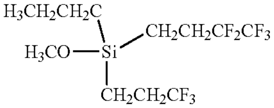

Formula 117

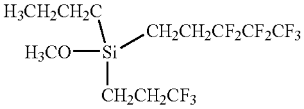

Formula 118

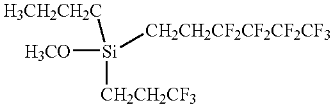

Formula 119

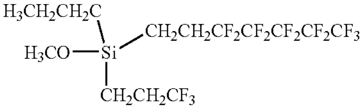

-continued

Formula 120

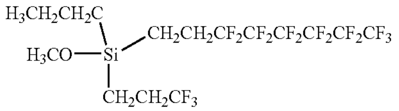

Formula 121

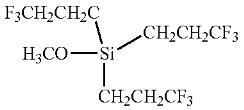

Formula 122

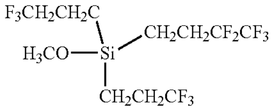

Formula 123

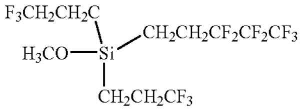

Formula 124

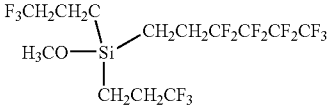

Formula 125

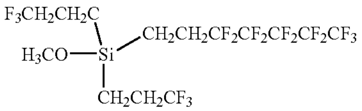

Formula 126

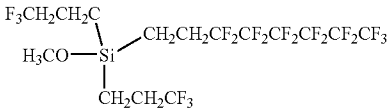

Formula 127

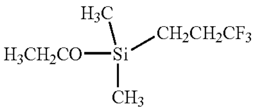

Formula 128

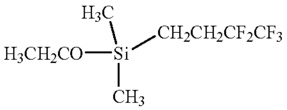

Formula 129

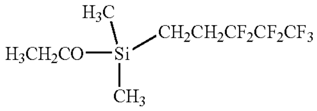

Formula 130

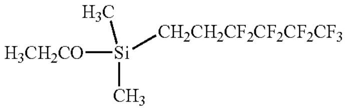

Formula 131

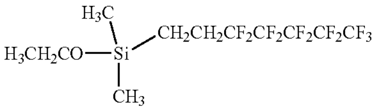

Formula 132

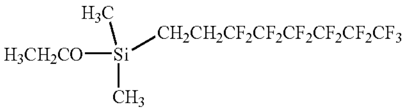

Now, the surface treatment on the nozzle plate 9 (water-repellent film 9*a*) with a trialkyl silane compound solution will be described in greater detail.

When a trialkyl chlorosilane is used as the trialkyl silane compound, the solvent to be used is preferably a non-aqueous solvent because a trialkyl chlorosilane easily reacts with water. Specific examples of the non-aqueous solvent include n-hexane, n-octane, iso-octane, n-decane, n-dodecane, cyclohexane, perfluoro-octane, toluene, and the like.

On the other hand, when a trialkyl alkoxysilane is used as the trialkyl silane compound, the solvent to be used is preferably a water-soluble solvent. Specific examples of the water-soluble solvent include a monoalcohol such as methanol, ethanol, n-propanol or isopropanol, and a mixed solvent of such a monoalcohol and water, for example.

Moreover, the concentration of the trialkyl silane compound is preferably 0.1 to 30 wt %. If the concentration is less than 0.1 wt %, the active hydrogen present on the surface of the nozzle plate 9 may not all react with the trialkyl silane compound, whereby some of the active hydrogen may remain on the surface of the nozzle plate 9. Moreover, the concentration does not need to be greater than 30 wt % because 100% of the active hydrogen will be consumed by the reaction with a concentration of as high as 30 wt %.

The period of time for which the nozzle plate 9 is immersed in the trialkyl silane compound solution is preferably 3 to 120 minutes. If the reaction time is less than 3 minutes, the active hydrogen present on the surface of the nozzle plate 9 may not all react with the trialkyl silane compound, whereby some of the active hydrogen may remain on the surface of the nozzle plate 9. Moreover, the period of time does not need to be greater than 120 minutes because 100% of the active hydrogen will be consumed by the reaction in about 30 to 120 minutes, though it depends on the concentration of the trialkyl silane compound.

Moreover, the nozzle plate 9, which has been immersed in a trialkyl silane compound solution, is preferably heated and dried at a temperature that is about 20° C. to 30° C. higher than the boiling point of the solvent in which the trialkyl silane compound is dissolved, in order to facilitate the drying process. Note that while the drying temperature may be further increased, the temperature does not have to be more than 30° C. higher than the boiling point of the solvent, in view of the drying process. For example, when n-hexane (boiling point: 69° C.) is used as the solvent, the drying temperature is preferably 89° C. to 99° C., and when a water-ethanol mixed solvent is used, the drying temperature is preferably 120° C. to 140° C.

Moreover, when the trialkyl silane compound is an alkoxysilane, the reaction will proceed more smoothly if about 0.1 wt % of an acid catalyst such as hydrochloric acid, for example, is added to the solution.

Note that the ink composition of Embodiment 1 may be used with the recording apparatus A of Embodiment 2. Moreover, in Embodiment 2, the nozzle plate 9 is subjected to a surface treatment so as to prevent ink from being deposited on the nozzle plate 9. Therefore, without influencing the water repellency of the nozzle plate 9, an ink composition as follows may alternatively be used.

That is, the ink composition includes a colorant (a dye or a pigment), a humectant, a penetrant, water, and a hydrolyzable silane compound. Unlike Embodiment 1, the silane compound may be a hydrolyzed product obtained by hydrolyzing an alkoxysilane containing an amino-group-containing organic group, and an alkoxysilane containing no amino group, or an organic silicon compound obtained by hydrolyzing a hydrolyzable silane that is obtained by reacting an amino-group-containing hydrolyzable silane with an organic monoepoxy compound, and a hydrolyzable silane containing no nitrogen atom.

EXAMPLE 1

Now, Example 1 of the ink composition for ink jet recording according to Embodiment 1 will be described.

In Example 1, 37 ink compositions for ink jet recording were produced, which are hereinbelow labeled as "Example 1-1" to "Example 1-37". Note that in the ink composition shown in each example below, the amount of each component is given in % by mass.

In each of Examples 1-1 to 1-37, glycerol was used as the humectant. Moreover, in Examples 1-6 to 1-37, diethylene glycol monobutyl ether was used as the penetrant.

Moreover, in Examples 1-1 to 1-28 and Examples 1-34 to 1-37, a dye was used as the colorant, whereas in Examples 1-29 to 1-33, a pigment was used as the colorant. Note that C.I. Acid Black 2 was used as the dye in most of the examples in which a dye is used, but dyes of different colors were used in Examples 1-26 to 1-28.

EXAMPLE 1-1

The ink composition of Example 1-1 is as shown below. An organic silicon compound (Al) was obtained as follows. Into 180 g (10 mol) of water in a reaction vessel, a mixture of 100 g (0.56 mol) of $H_2NCH_2CH_2CH_2Si(OCH_3)_3$, 61.1 g (0.28 mol) of the fluoroalkyl alkoxysilane of Formula 1, and 166 g (1.1 mol) of $Si(OCH_3)_4$ was added drop by drop at room temperature. After the whole quantity of the mixture was added, the obtained liquid was stirred for one hour at 60° C. to obtain the organic silicon compound (A1).

| | |
|---|---|
| C.I. Acid Black 2 | 5% |
| glycerol | 10% |
| diethylene glycol | 7% |
| organic silicon compound (A1) | 10% |
| pure water | 68% |

EXAMPLE 1-2

The ink composition of Example 1-2 is similar to that of Example 1-1 except that an organic silicon compound (A2) was used. The organic silicon compound (A2) was obtained by using 75.1 g (0.28 mol) of the fluoroalkyl alkoxysilane of Formula 2 instead of the fluoroalkyl alkoxysilane of Formula 1.

| | |
|---|---|
| C.I. Acid Black 2 | 5% |
| glycerol | 10% |
| diethylene glycol | 7% |
| organic silicon compound (A2) | 10% |
| pure water | 68% |

EXAMPLE 1-3

The ink composition of Example 1-3 is similar to that of Example 1-1 except that an organic silicon compound (A3) was used. The organic silicon compound (A3) was obtained by using 89.1 g (0.28 mol) of the fluoroalkyl alkoxysilane of Formula 3 instead of the fluoroalkyl alkoxysilane of Formula 1.

| | |
|---|---|
| C.I. Acid Black 2 | 5% |
| glycerol | 10% |
| diethylene glycol | 7% |
| organic silicon compound (A3) | 10% |
| pure water | 68% |

EXAMPLE 1-4

The ink composition of Example 1-4 is similar to that of Example 1-1 except that an organic silicon compound (A4) was used. The organic silicon compound (A4) was obtained by using 103.1 g (0.28 mol) of the fluoroalkyl alkoxysilane of Formula 4 instead of the fluoroalkyl alkoxysilane of Formula 1.

| | |
|---|---|
| C.I. Acid Black 2 | 5% |
| glycerol | 10% |
| diethylene glycol | 7% |
| organic silicon compound (A4) | 10% |
| pure water | 68% |

EXAMPLE 1-5

The ink composition of Example 1-5 is similar to that of Example 1-1 except that an organic silicon compound (A5) was used. The organic silicon compound (A5) was obtained by using 117.1 g (0.28 mol) of the fluoroalkyl alkoxysilane of Formula 5 instead of the fluoroalkyl alkoxysilane of Formula 1.

| | |
|---|---|
| C.I. Acid Black 2 | 5% |
| glycerol | 10% |
| diethylene glycol | 7% |
| organic silicon compound (A5) | 10% |
| pure water | 68% |

EXAMPLE 1-6

The ink composition of Example 1-6 is similar to that of Example 1-1 except that it further contains diethylene glycol monobutyl ether as a penetrant.

| | |
|---|---|
| C.I. Acid Black 2 | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-7

The ink composition of Example 1-7 is similar to that of Example 1-2 except that it further contains diethylene glycol monobutyl ether as a penetrant.

| | |
|---|---|
| C.I. Acid Black 2 | 5% |
| glycerol | 10% |
| diethylene glycol monobutyl ether | 5% |
| diethylene glycol | 7% |
| organic silicon compound (A2) | 10% |
| pure water | 63% |

EXAMPLE 1-8

The ink composition of Example 1-8 is similar to that of Example 1-3 except that it further contains diethylene glycol monobutyl ether as a penetrant.

| | |
|---|---|
| C.I. Acid Black 2 | 5% |
| glycerol | 10% |
| diethylene glycol monobutyl ether | 5% |
| diethylene glycol | 7% |
| organic silicon compound (A3) | 10% |
| pure water | 63% |

EXAMPLE 1-9

The ink composition of Example 1-9 is similar to that of Example 1-4 except that it further contains diethylene glycol monobutyl ether as a penetrant.

| | |
|---|---|
| C.I. Acid Black 2 | 5% |
| glycerol | 10% |
| diethylene glycol monobutyl ether | 5% |
| diethylene glycol | 7% |
| organic silicon compound (A4) | 10% |
| pure water | 63% |

EXAMPLE 1-10

The ink composition of Example 1-10 is similar to that of Example 1-5 except that it further contains diethylene glycol monobutyl ether as a penetrant.

| | |
|---|---|
| C.I. Acid Black 2 | 5% |
| glycerol | 10% |
| diethylene glycol monobutyl ether | 5% |
| diethylene glycol | 7% |
| organic silicon compound (A5) | 10% |
| pure water | 63% |

EXAMPLE 1-11

The ink composition of Example 1-11 is similar to that of Example 1-6 except that an organic silicon compound (A6) was used. The organic silicon compound (A6) was obtained by using 131.1 g (0.28 mol) of the fluoroalkyl alkoxysilane of Formula 6 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (A6) | 10% |
| pure water | 63% |

EXAMPLE 1-12

The ink composition of Example 1-12 is similar to that of Example 1-6 except that an organic silicon compound (A7) was used. The organic silicon compound (A7) was obtained by using 145.1 g (0.28 mol) of the fluoroalkyl alkoxysilane of Formula 7 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (A7) | 10% |
| pure water | 63% |

EXAMPLE 1-13

The ink composition of Example 1-13 is similar to that of Example 1-6 except that an organic silicon compound (A8) was used. The organic silicon compound (A8) was obtained by using 159.1 g (0.28 mol) of the fluoroalkyl alkoxysilane of Formula 8 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (A8) | 10% |
| pure water | 63% |

EXAMPLE 1-14

The ink composition of Example 1-14 is similar to that of Example 1-6 except that an organic silicon compound (A9) was used. The organic silicon compound (A9) was obtained by using 173.1 g (0.28 mol) of the fluoroalkyl alkoxysilane of Formula 9 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (A9) | 10% |
| pure water | 63% |

EXAMPLE 1-15

The ink composition of Example 1-15 is similar to that of Example 1-6 except that an organic silicon compound (A10) was used. The organic silicon compound (A10) was obtained by using 187.1 g (0.28 mol) of the fluoroalkyl alkoxysilane of Formula 10 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (A10) | 10% |
| pure water | 63% |

EXAMPLE 1-16

The ink composition of Example 1-16 is as shown below. An organic silicon compound (C1) was obtained as follows. Into 100 g (0.56 mol) of $H_2NCH_2CH_2CH_2Si(OCH_3)_3$ in a reaction vessel, 49 g (0.66 mol) of 2,3-epoxy-1-propanol was added drop by drop. After the whole quantity of 2,3-epoxy-1-propanol was added, the obtained liquid was stirred for five hours at 80° C. so as to let the amino group and the epoxy group react with each other to obtain a hydrolyzable silane (B). A mixture of 120 g (6.67 mol) of water, 50.6 g (0.2 mol) of the hydrolyzable silane (B), 21.8 g (0.1 mol) of the fluoroalkyl alkoxysilane of Formula 1, and 30.4 g (0.2 mol) of $Si(OCH_3)_4$ was added into another reaction vessel. After the whole quantity of the mixture was added, the mixture was left standing for one hour at 60° C. to let the reaction proceed to obtain the organic silicon compound (C1).

| | |
|---|---|
| C.I. Acid Black 2 | 5% |
| glycerol | 10% |
| diethylene glycol monobutyl ether | 5% |
| diethylene glycol | 7% |
| organic silicon compound (C1) | 10% |
| pure water | 63% |

EXAMPLE 1-17

The ink composition of Example 1-17 is similar to that of Example 1-16 except that an organic silicon compound (C2) was used. The organic silicon compound (C2) was obtained by using 26.8 g (0.1 mol) of the fluoroalkyl alkoxysilane of Formula 2 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C2) | 10% |
| pure water | 63% |

EXAMPLE 1-18

The ink composition of Example 1-18 is similar to that of Example 1-16 except that an organic silicon compound (C3) was used. The organic silicon compound (C3) was obtained by using 31.8 g (0.1 mol) of the fluoroalkyl alkoxysilane of Formula 3 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C3) | 10% |
| pure water | 63% |

EXAMPLE 1-19

The ink composition of Example 1-19 is similar to that of Example 1-16 except that an organic silicon compound (C4) was used. The organic silicon compound (C4) was obtained by using 36.8 g (0.1 mol) of the fluoroalkyl alkoxysilane of Formula 4 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C4) | 10% |
| pure water | 63% |

EXAMPLE 1-20

The ink composition of Example 1-20 is similar to that of Example 1-16 except that an organic silicon compound (C5) was used. The organic silicon compound (C5) was obtained by using 41.8 g (0.1 mol) of the fluoroalkyl alkoxysilane of Formula 5 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C5) | 10% |
| pure water | 63% |

EXAMPLE 1-21

The ink composition of Example 1-21 is similar to that of Example 1-16 except that an organic silicon compound (C6) was used. The organic silicon compound (C6) was obtained by using 46.8 g (0.1 mol) of the fluoroalkyl alkoxysilane of Formula 6 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |

-continued

| | |
|---|---|
| organic silicon compound (C6) | 10% |
| pure water | 63% |

EXAMPLE 1-22

The ink composition of Example 1-22 is similar to that of Example 1-16 except that an organic silicon compound (C7) was used. The organic silicon compound (C7) was obtained by using 51.8 g (0.1 mol) of the fluoroalkyl alkoxysilane of Formula 7 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C7) | 10% |
| pure water | 63% |

EXAMPLE 1-23

The ink composition of Example 1-23 is similar to that of Example 1-16 except that an organic silicon compound (C8) was used. The organic silicon compound (C8) was obtained by using 56.8 g (0.1 mol) of the fluoroalkyl alkoxysilane of Formula 8 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C8) | 10% |
| pure water | 63% |

EXAMPLE 1-24

The ink composition of Example 1-24 is similar to that of Example 1-16 except that an organic silicon compound (C9) was used. The organic silicon compound (C9) was obtained by using 61.8 g (0.1 mol) of the fluoroalkyl alkoxysilane of Formula 9 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C9) | 10% |
| pure water | 63% |

EXAMPLE 1-25

The ink composition of Example 1-25 is similar to that of Example 1-16 except that an organic silicon compound (C10) was used. The organic silicon compound (C10) was obtained by using 66.8 g (0.1 mol) of the fluoroalkyl alkoxysilane of Formula 10 instead of the fluoroalkyl alkoxysilane of Formula 1.

| | |
|---|---|
| C.I. Acid Black 2 | 5% |
| glycerol | 10% |
| diethylene glycol monobutyl ether | 5% |
| diethylene glycol | 7% |
| organic silicon compound (C10) | 10% |
| pure water | 63% |

EXAMPLE 1-26

The ink composition of Example 1-26 is similar to that of Example 1-6 except that C.I. Acid Yellow 23 was used instead of C.I. Acid Black 2.

| | |
|---|---|
| C.I. Acid Yellow 23 | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-27

The ink composition of Example 1-27 is similar to that of Example 1-6 except that C.I. Acid Red 52 was used instead of C.I. Acid Black 2.

| | |
|---|---|
| C.I. Acid Red 52 | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-28

The ink composition of Example 1-28 is similar to that of Example 1-6 except that C.I. Acid Blue 86 was used instead of C.I. Acid Black 2.

| | |
|---|---|
| C.I. Acid Blue 86 | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-29

The ink composition of Example 1-29 is similar to that of Example 1-6 except that a black pigment was used instead of C.I. Acid Black 2.

| | |
|---|---|
| carbon black ("CAB-O-JETTM-200" manufactured by Cabot Corporation) | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-30

The ink composition of Example 1-30 is similar to that of Example 1-6 except that a black pigment was used instead of C.I. Acid Black 2.

| | |
|---|---|
| carbon black ("CAB-O-JETTM-300" manufactured by Cabot Corporation) | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-31

The ink composition of Example 1-31 is similar to that of Example 1-6 except that a color pigment was used instead of C.I. Acid Black 2.

| | |
|---|---|
| yellow pigment ("FUJI SP YELLOW 4223" manufactured by Fuji Pigment Co., Ltd.) | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-32

The ink composition of Example 1-32 is similar to that of Example 1-6 except that a color pigment was used instead of C.I. Acid Black 2.

| | |
|---|---|
| magenta pigment ("FUJI SP MAGENTA 9338" manufactured by Fuji Pigment Co., Ltd.) | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-33

The ink composition of Example 1-33 is similar to that of Example 1-6 except that a color pigment was used instead of C.I. Acid Black 2.

| | |
|---|---|
| cyan pigment ("FUJI SP BLUE 6403" manufactured by Fuji Pigment Co., Ltd.) | 5% |
| glycerol | 10% |
| diethylene glycol monobutyl ether | 5% |
| diethylene glycol | 7% |
| organic silicon compound (A1) | 10% |
| pure water | 63% |

EXAMPLE 1-34

The ink composition of Example 1-34 is similar to that of Example 1-6 except that an organic silicon compound (A11) was used, which was obtained by changing the amount of the fluoroalkyl alkoxysilane from 61.1 g (0.28 mol) to 244.4 g (1.12 mol).

| | |
|---|---|
| C.I. Acid Black 2 | 5% |
| glycerol | 10% |
| diethylene glycol monobutyl ether | 5% |
| diethylene glycol | 7% |
| organic silicon compound (A11) | 10% |
| pure water | 63% |

EXAMPLE 1-35

The ink composition of Example 1-35 is similar to that of Example 1-6 except that an organic silicon compound (A12) was used, which was obtained by changing the amount of the fluoroalkyl alkoxysilane from 61.1 g (0.28 mol) to 122.2 g (0.56 mol).

| | |
|---|---|
| C.I. Acid Black 2 | 5% |
| glycerol | 10% |
| diethylene glycol monobutyl ether | 5% |
| diethylene glycol | 7% |
| organic silicon compound (A12) | 10% |
| pure water | 63% |

EXAMPLE 1-36

The ink composition of Example 1-36 is similar to that of Example 1-6 except that an organic silicon compound (A13) was used, which was obtained by changing the amount of the fluoroalkyl alkoxysilane from 61.1 g (0.28 mol) to 24.4 g (0.112 mol).

| | |
|---|---|
| C.I. Acid Black 2 | 5% |
| glycerol | 10% |
| diethylene glycol monobutyl ether | 5% |
| diethylene glycol | 7% |
| organic silicon compound (A13) | 10% |
| pure water | 63% |

EXAMPLE 1-37

The ink composition of Example 1-37 is similar to that of Example 1-6 except that an organic silicon compound (A14) was used, which was obtained by changing the amount of the fluoroalkyl alkoxysilane from 61.1 g (0.28 mol) to 10.1 g (0.056 mol).

| | |
|---|---|
| C.I. Acid Black 2 | 5% |
| glycerol | 10% |
| diethylene glycol monobutyl ether | 5% |
| diethylene glycol | 7% |
| organic silicon compound (A15) | 10% |
| pure water | 63% |

Then, two other ink compositions (Comparative Examples 1-1 and 1-2) were produced for the purpose of comparison. Again, in the ink composition shown in each comparative example below, the amount of each component is given in % by mass.

Comparative Example 1-1

The ink composition of Comparative Example 1-1 is similar to that of Example 1-1 except that an organic silicon compound (A16) was used instead of the organic silicon compound (A1). The organic silicon compound (A16) was obtained through a reaction as that for the organic silicon compound (A1) except that the fluoroalkyl alkoxysilane was not used.

| | |
|---|---|
| C.I. Acid Black 2 | 5% |
| glycerol | 10% |
| diethylene glycol | 7% |
| organic silicon compound (A16) | 10% |
| pure water | 68% |

Comparative Example 1-2

The ink composition of Comparative Example 1-2 is similar to that of Example 1-16 except that an organic silicon compound (C11) was used instead of the organic silicon compound (C1). The organic silicon compound (C11) was obtained through a reaction as that for the organic silicon compound (C1) except that the fluoroalkyl alkoxysilane was not used.

| | |
|---|---|
| C.I. Acid Black 2 | 5% |
| glycerol | 10% |
| diethylene glycol | 7% |
| organic silicon compound (C11) | 10% |
| pure water | 68% |

Then, using the ink composition of each of Examples 1-1 to 1-37 and Comparative Examples 1-1 and 1-2, an image was formed on plain paper ("Xerox4024" manufactured by Xerox Corporation) by a printer that discharges ink using a piezoelectric actuator as in the embodiments described above. Each ink composition was tested with various nozzle plates provide on the ink jet head of the printer. The nozzle plates included those coated with a water-repellent sol-gel film, an electroless nickel plating film with polytetrafluoroethylene fine grains being dispersed therein, a polymerized fluoro compound film, and a coating film of a fluorine-containing silane coupling agent. Each of the nozzle plates had an initial contact angle of 60° or more with respect to the-ink, indicating a good ink repellency.

During a continuous printing operation with the ink composition of each comparative example, an image distortion started occur, and after about three minutes, the ink discharge started to decrease, resulting in white streaks (banding) in the printed image. As the printing operation was further continued, the number of nozzles through which ink was no longer discharged increased, and after about 30 minutes, the printed image (letters) was illegible. At this point, some ink deposit was observed on the nozzle plate around the nozzles. After a cleaning operation of wiping off the ink around the nozzles with a rubber blade, the contact angle with respect to ink was measured to be 15° to 20°.

On the other hand, with the ink compositions of the examples, the initial, desirable ink discharge did not deteriorate through a continuous printing operation, and no white streaks or white spots were observed in the printed image. Even after the printing operation was further continued, the ink discharge was still stable, and no white streaks or white spots were observed in the printed image. Moreover, no image distortion was observed. After a continuous printing operation for 30 minutes, a slight amount of ink was deposited around nozzles. After a cleaning operation of wiping off the ink around the nozzles with a rubber blade, the contact angle with respect to ink was measured to be ±2° with respect to the initial value.

Each sheet of paper with the image formed thereon was immersed in pure water, and then left standing at room temperature until it is dried so as to examine the presence/absence of image bleeding. No image bleeding was observed for the ink compositions of the examples, indicating that the ink compositions of the examples had desirable water-resistivity.

Thus, the water repellency of the nozzle plate surface does not deteriorate through a continuous printing operation when a fluoroalkyl group is introduced to a water-soluble substance that undergoes condensation polymerization in the absence of water (a hydrolyzable silane compound), which is an ink component, as in the ink compositions of the examples. As a result, it is possible to prevent image distortion due to a shift in the ink landing position and clogging of the nozzles 14, whereby a high-quality image can be formed.

EXAMPLE 2

Now, Example 2 of the nozzle plate for ink jet recording according to Embodiment 2 will be described.

In Examples 2-1 to 2-124, a sol-gel film containing a fluoroalkyl silane was formed on a nozzle plate as a water-repellent film, whereas in Examples 2-125 to 2-127, other types of films were used as the water-repellent film.

In Examples 2-1 to 2-124, the water-repellent film was formed as follows. First, two different solutions (Solution A and Solution B) having the following compositions were prepared.

| Solution A | |
|---|---|
| $CF_3(CF_2)_7C_2H_4Si(OCH_3)_3$ | 4 ml |
| tetraethoxy silane | 25 ml |
| 2,2,2-trifluoroethanol | 50 ml |
| Solution B | |
| hydrochloric acid | 0.4 ml |
| 2,2,2-trifluoroethanol | 50 ml |
| water | 7 ml |

Then, Solution B was added from a funnel into Solution A in a 200-ml beaker while stirring the solution with a magnetic stirrer to obtain a mixed solution (coating solution) of Solution A and Solution B.

On the other hand, a stainless steel base material having a length of 10 mm, a width of 10 mm and a thickness of 0.2 mm to be a nozzle plate was washed with a surfactant, and further washed under running water to remove the contaminant on the surface of the base material.

Then, the base material was mounted on a spin coater, and the coating solution was dropped thereonto, after which it was spun at 500 rpm for five seconds and then at 300 rpm for 20 seconds to spread the coating solution across the surface of the base material.

Then, the base material was detached from the spin coater and dried at room temperature for one hour, after which it was baked at 200° C. for 30 minutes. Thus, a thin water-repellent film having a thickness of about 0.2 μm was formed on the surface of the base material.

Then, predetermined through holes (nozzles) were formed in the base material having the thin water-repellent film formed thereon by using a picosecond laser, thereby obtaining an unfinished nozzle plate.

EXAMPLE 2-1

The unfinished nozzle plate having the water-repellent film formed thereon was immersed for 60 minutes in an n-octane solution containing 5 wt % of trimethylchlorosilane of Formula 11, and then dried at 140° C. for 30 minutes. Thus, the unfinished nozzle plate (the water-repellent film thereof) was subjected to a surface treatment to obtain the nozzle plate of Example 2-1.

EXAMPLE 2-2

The nozzle plate of Example 2-2 was obtained by a surface treatment similar to that of Example 2-1 except that dimethylethylchlorosilane of Formula 12 was used instead of trimethylchlorosilane of Formula 11.

EXAMPLES 2-3 to 2-54

The nozzle plates of Examples 2-3 to 2-54 were obtained by a surface treatment similar to that of Example 2-1 except that chlorosilanes of Formulae 13 to 64, respectively, were used instead of trimethylchlorosilane of Formula 11.

EXAMPLE 2-55

An unfinished nozzle plate was immersed for 60 minutes in a water-ethanol (at weight ratio of 1:1) mixed solution containing 5 wt % of trimethylmethoxysilane of Formula 65 (with 0.1 wt % of hydrochloric acid), instead of the n-octane solution containing 5 wt % of trimethylchlorosilane of Formula 11 used in Example 2-1, and then dried at 120° C. for 30 minutes. Thus, the unfinished nozzle plate was subjected to a surface treatment to obtain the nozzle plate of Example 2-55.

EXAMPLE 2-56

The nozzle plate of Example 2-56 was obtained by a surface treatment similar to that of Example 2-55 except that dimetylethylmethoxysilane of Formula 66 was used instead of trimethylmethoxysilane of Formula 65.

EXAMPLES 2-57 to 2-122

The nozzle plates of Examples 2-57 to 2-122 were obtained by a surface treatment similar to that of Example 2-55 except that methoxysilanes and ethoxysilanes of Formulae 67 to 132, respectively, were used instead of trimethylmethoxysilane of Formula 65.

EXAMPLE 2-123

The nozzle plate of Example 2-123 was obtained by a surface treatment similar to that of Example 2-1 except that the concentration of trimethylchlorosilane was changed from 5 wt % to 0.1 wt %.

EXAMPLE 2-124

The nozzle plate of Example 2-124 was obtained by a surface treatment similar to that of Example 2-1 except that the concentration of trimethylchlorosilane was changed from 5 wt % to 30 wt %.

EXAMPLE 2-125

The nozzle plate of EXAMPLE 2-125 was obtained by a surface treatment similar to that of Example 2-1 except that a film of a polymerized fluoro-compound ("Cytop" manufactured by Asahi Kasei Corporation) was used as the water-repellent film formed on the unfinished nozzle plate. Note that the water-repellent film was formed according to the method described in Japanese Laid-Open Patent Publication No. 6-8448.

EXAMPLE 2-126

The nozzle plate of EXAMPLE 2-126 was obtained by a surface treatment similar to that of Example 2-1 except that a film of an electroless nickel plating solution ("Nimuden" manufactured by C. Uyemura & Co., Ltd.) with polytetrafluoroethylene fine grains being dispersed therein was used as the water-repellent film formed on the unfinished nozzle plate. Note that the water-repellent film was formed according to the method described in Japanese Laid-Open Patent Publication No. 9-164689.

EXAMPLE 2-127

The nozzle plate of EXAMPLE 2-127 was obtained by a surface treatment similar to that of Example 2-1 except that a high-frequency plasma CVD film of trimethylmethoxysilane was used as the water-repellent film formed on the unfinished nozzle plate. Note that the water-repellent film was formed according to the method described in Japanese Laid-Open Patent Publication No. 2001-63043.

Then, other nozzle plates as described below (Comparative Examples 2-1 2-6) were produced for the purpose of comparison.

Comparative Example 2-1

The nozzle plate of Comparative Example 2-1 is similar to that of Example 2-1 except for the omission of the surface treatment using a trimethylchlorosilane solution on the unfinished nozzle plate after the formation of the sol-gel film containing a fluoroalkyl silane.

Comparative Example 2-2

The nozzle plate of Comparative Example 2-2 was obtained by a surface treatment similar to that of Example 2-1 except that the concentration of trimethylchlorosilane was changed from 5 wt % to 0.01 wt %.

Comparative Example 2-3

The nozzle plate of Comparative Example 2-3 was obtained by a surface treatment similar to that of Example 2-1 except that the period of time for which the unfinished nozzle plate was immersed in a trimethylchlorosilane solution was changed from 60 minutes to 1 minute.

Comparative Example 2-4

The nozzle plate of Comparative Example 2-4 is similar to that of Example 2-125 except for the omission of the surface treatment using a trimethylchlorosilane solution on the unfinished nozzle plate after the formation of the polymerized fluoro compound film.

Comparative Example 2-5

The nozzle plate of Comparative Example 2-5 is similar to that of Example 2-126 except for the omission of the surface treatment using a trimethylchlorosilane solution on the unfinished nozzle plate after the formation of the electroless nickel plating film with polytetrafluoroethylene fine grains dispersed therein.

Comparative Example 2-6

The nozzle plate of Comparative Example 2-6 is similar to that of Example 2-127 except for the omission of the surface treatment using a trimethylchlorosilane solution on the unfinished nozzle plate after the formation of the high-frequency plasma CVD film of trimethylmethoxysilane.

Now, the ink composition used in Example 2 will be described. In Example 2, four ink compositions as shown below (Ink Compositions 1 to 4) were produced. The organic silicon compound contained in these ink compositions was an organic silicon compound (A) or an organic silicon compound (C), which were obtained as follows.

The organic silicon compound (A) was obtained as follows. Into 180 g (1 mol) of water in a reaction vessel, a mixture of 100 g (0.56 mol) of $H_2NCH_2CH_2CH_2Si(OCH_3)_3$ and 166 g (1.1 mol) of $Si(OCH_3)_4$ was added drop by drop at room temperature. After the whole quantity of the mixture was added, the obtained liquid was stirred for one hour at 60° C. to obtain the organic silicon compound (A).

On the other hand, the organic silicon compound (C) was obtained as follows. Into 100 g (0.56 mol) of $H_2NCH_2CH_2CH_2Si(OCH_3)_3$ in a reaction vessel, 49 g (0.66 mol) of 2,3-epoxy-1-propanol was added drop by drop. After the whole quantity of 2,3-epoxy-1-propanol was added, the obtained liquid was stirred for five hours at 80° C. so as to let the amino group and the epoxy group react with each other to obtain a hydrolyzable silane (B). Then, a mixture of 120 g (6.67 mol) of water, 50.6 g (0.2 mol) of the hydrolyzable silane (B), and 30.4 g (0.2 mol) of $Si(OCH_3)_4$ was added into another reaction vessel. After the quantity of the mixture was added, the mixture was left standing for one hour at 60° C. to let the reaction proceed to obtain the organic silicon compound (C).

| | |
|---|---|
| Ink Composition 1 | |
| C.I. Acid Black 2 | 5% |
| glycerol | 10% |
| organic silicon compound (A) | 10% |
| pure water | 75% |
| Ink Composition 2 | |
| C.I. Acid Black 2 | 5% |
| glycerol | 10% |
| diethylene glycol monobutyl ether | 5% |
| organic silicon compound (A) | 10% |
| pure water | 70% |
| Ink Composition 3 | |
| C.I. Acid Black 2 | 5% |
| glycerol | 10% |
| organic silicon compound (C) | 5% |
| pure water | 80% |
| Ink Composition 4 | |
| C.I. Acid Black 2 | 5% |
| glycerol | 10% |
| diethylene glycol monobutyl ether | 5% |
| organic silicon compound (C) | 5% |
| pure water | 75% |

For the nozzle plates of Examples 2-1 to 2-127 and those of Comparative Examples 2-1 to 2-6, the contact angles with respect to water were measured to be in the range of 105° to 110°.

The nozzle plates of the examples and the comparative examples were immersed in each of Ink Compositions 1 to 4 for 24 hours, and then washed under running water. After the nozzle plates were dried, the contact angles with respect to water were measured. The contact angles of the nozzle plates of the examples did not change from the initial values and were in the range of 105° to 110°, whereas the contact angles of the nozzle plates of the comparative examples were 30° or less, indicating that the surface of each of the nozzle plates of the comparative examples had been turned hydrophilic.

Moreover, using each of the nozzle plates of the examples and the comparative examples attached to a printer, an image was formed with each of Ink Compositions 1 and 2.

During a continuous printing operation with the nozzle plate of each comparative example, an image distortion started occur, and after about three minutes, the ink discharge started to decrease, resulting in white streaks in the printed image. As the printing operation was further continued, the number of nozzles through which ink was no longer discharged increased, and after about 30 minutes, the printed image (letters) was illegible. At this point, some ink deposit was observed on the nozzle plate around the nozzles. After a cleaning operation of wiping off the ink around the nozzles with a rubber blade, the contact angle with respect to ink was measured to be 20° to 30°.

On the other hand, with the nozzle plate of each example, the initial, desirable ink discharge did not deteriorate through a continuous printing operation, and no white streaks or white spots were observed in the printed image. Even after the printing operation was further continued, the ink discharge was still stable, and no white streaks or white spots were observed in the printed image. Moreover, no image distortion was observed. After a continuous printing operation for 30 minutes, a slight amount of ink was deposited around nozzles. After a cleaning operation of wiping off the ink around the nozzles with a rubber blade, the contact angle with respect to ink was measured to be ±2° with respect to the initial value.

Thus, if a surface treatment with a trialkyl silane compound solution is performed as with the nozzle plates of the examples, the water repellency of the nozzle plate surface does not deteriorate through a continuous printing operation using ink that contains a water-soluble substance that undergoes condensation polymerization in the absence of water (a hydrolyzable silane compound). As a result, it is possible to prevent image distortion due to a shift in the ink landing position and clogging of the nozzles, whereby a high-quality image can be formed.

What is claimed is:

1. A method of reducing clogging of a nozzle having a nozzle plate in an ink jet recording apparatus, the method comprising:

providing an ink composition in the ink jet recording apparatus, wherein the ink composition comprises a colorant, a humectant, a penetrant, water, and a water-soluble substance that includes a hydrophobic fluoroalkyl group and that undergoes condensation polymerization in the absence of the water;

discharging said ink composition through the nozzle plate, wherein the nozzle plate has at least one surface with active hydrogen; and reacting said water-soluble substance with the active hydrogen on the nozzle plate surface, wherein said fluoroalkyl group prevents further deposition of the ink composition on the nozzle plate surface, thereby reducing clogging of the ink composition.

2. The method of claim 1, wherein the water-soluble substance is a hydrolyzable silane compound.

3. The method of claim 1, wherein the water-soluble substance includes a fluoroalkyl group and an amino alkyl group; and an amount of the fluoroalkyl group is 0.1 to 1 times that of the amino alkyl group.

4. A method of maintaining water-repellency of the surface of the nozzle plate of an ink jet recording apparatus the method comprising:

providing an ink composition in the ink jet recording apparatus, wherein the ink composition comprises a colorant, a humectant, a penetrant, water, and a water-soluble substance that includes a hydrophobic fluoroalkyl group and that undergoes condensation polymerization in the absence of the water;

contacting said ink composition with the water-repellent surface, wherein the water-repellent surface has active hydrogen;

reacting said water-soluble substance with the active hydrogen on the surface, wherein the said fluoroalkyl groups provide and maintain water-repellency of the surface, thereby preventing deposition of the ink composition on the surface to reduce clogging of the ink composition.

5. The method of claim 4, wherein the water-soluble substance is a hydrolyzable silane compound.

6. The method of claim 4, wherein the water-soluble substance includes a fluoroalkyl group and an amino alkyl group; and an amount of the fluoroalkyl group is 0.1 to 1 times that of the amino alkyl group.

* * * * *